(12) United States Patent
Yuan et al.

(10) Patent No.: US 11,893,780 B2
(45) Date of Patent: Feb. 6, 2024

(54) METHOD AND APPARATUS FOR IMAGE SEGMENTATION

(71) Applicant: Samsung Electronics Co., Ltd., Gyeonggi-do (KR)

(72) Inventors: Jianlong Yuan, Beijing (CN); Hanchao Jia, Beijing (CN); Shu Wang, Beijing (CN); Zhenbo Luo, Beijing (CN)

(73) Assignee: Samsung Electronics Co., Ltd

( * ) Notice: Subject to any disclaimer, the term of this patent is extended or adjusted under 35 U.S.C. 154(b) by 295 days.

(21) Appl. No.: 17/294,020

(22) PCT Filed: Nov. 15, 2019

(86) PCT No.: PCT/KR2019/015702
§ 371 (c)(1),
(2) Date: May 14, 2021

(87) PCT Pub. No.: WO2020/101448
PCT Pub. Date: May 22, 2020

(65) Prior Publication Data
US 2022/0004808 A1  Jan. 6, 2022

(30) Foreign Application Priority Data

Nov. 15, 2018 (CN) .......................... 201811361168.X

(51) Int. Cl.
*G06V 10/82* (2022.01)
*G06T 7/136* (2017.01)
(Continued)

(52) U.S. Cl.
CPC ............ *G06V 10/82* (2022.01); *G06F 18/213* (2023.01); *G06F 18/24* (2023.01); *G06F 18/253* (2023.01);
(Continued)

(58) Field of Classification Search
CPC ...... G06V 10/82; G06V 10/26; G06V 10/267; G06F 18/213; G06F 18/24; G06F 18/253;
(Continued)

(56) References Cited

U.S. PATENT DOCUMENTS 10,408,939 B1 * 9/2019 Kim ....................... G06V 10/80
10,852,439 B1 * 12/2020 Wang ....................... G01W 1/10
(Continued)

FOREIGN PATENT DOCUMENTS

| CN | 106886801 | 6/2017 |
| CN | 107564025 | 1/2018 |

(Continued)

OTHER PUBLICATIONS

PCT/ISA/210 Search Report issued on PCT/KR2019/015702, dated Mar. 3, 2020, pp. 3.
(Continued)

*Primary Examiner* — Mia M Thomas
(74) *Attorney, Agent, or Firm* — The Farrell Law Firm, P.C.

(57) ABSTRACT

The present disclosure provides a method for image segmentation, an electronic device and a computer readable storage medium, relating to the field of computer vision technology and artificial intelligence technology. The method comprises: performing feature extraction on an image through a feature extraction network to obtain a feature map; performing feature map processing on the feature map to complete semantic segmentation of the image. The disclosure may effectively improve performance of semantic segmentation.

19 Claims, 40 Drawing Sheets

(51) Int. Cl.
  *G06T 7/11* (2017.01)
  *G06F 18/213* (2023.01)
  *G06F 18/24* (2023.01)
  *G06F 18/25* (2023.01)
  *G06V 10/26* (2022.01)

(52) U.S. Cl.
  CPC ............... *G06T 7/11* (2017.01); *G06T 7/136* (2017.01); *G06V 10/26* (2022.01)

(58) Field of Classification Search
  CPC ......... G06F 18/214; G06T 7/11; G06T 7/136; G06T 2207/20084
  See application file for complete search history.

(56) References Cited

U.S. PATENT DOCUMENTS

| | | | |
|---|---|---|---|
| 11,120,276 B1* | 9/2021 | Zhang | G06T 7/10 |
| 11,321,937 B1* | 5/2022 | Jiang | G06V 20/647 |
| 11,551,433 B2* | 1/2023 | Lee | G06V 10/25 |
| 2016/0239711 A1* | 8/2016 | Gong | G06V 40/173 |
| 2016/0358337 A1 | 12/2016 | Dai et al. | |
| 2018/0114071 A1 | 4/2018 | Wang | |
| 2018/0253622 A1 | 9/2018 | Chen et al. | |
| 2018/0260956 A1 | 9/2018 | Huang et al. | |
| 2019/0057507 A1* | 2/2019 | El-Khamy | G06T 11/60 |
| 2019/0065817 A1* | 2/2019 | Mesmakhosroshahi | G06V 20/698 |
| 2020/0134365 A1* | 4/2020 | Liu | G06V 10/806 |
| 2020/0167929 A1* | 5/2020 | Wang | G06T 7/0012 |
| 2020/0334819 A1* | 10/2020 | Chen | G06V 10/454 |
| 2021/0073578 A1* | 3/2021 | Hu | G06F 18/213 |
| 2021/0150194 A1* | 5/2021 | Wang | G06N 20/00 |
| 2021/0248812 A1* | 8/2021 | Kuang | G06T 17/00 |
| 2021/0350168 A1* | 11/2021 | Tian | G06V 10/457 |
| 2022/0036562 A1* | 2/2022 | Wu | G06T 7/11 |
| 2022/0114731 A1 | 4/2022 | Dai et al. | |
| 2023/0140170 A1* | 5/2023 | Xiong | H04N 13/239 345/419 |
| 2023/0281751 A1* | 9/2023 | Yan | G06T 7/337 382/100 |

FOREIGN PATENT DOCUMENTS

| | | |
|---|---|---|
| CN | 108062756 | 5/2018 |
| CN | 108389251 | 8/2018 |
| KR | 10-2018-0067909 | 6/2018 |

OTHER PUBLICATIONS

PCT/ISA/237 Written Opinion issued on PCT/KR2019/015702, dated Mar. 3, 2020, pp. 5.
Yingying Jiang et al., "R2CNN: Rotational Region CNN for Orientation Robust Scene Text Detection", arXiv:1706.09579 V2, Jun. 30, 2017, 8 pages.
Liang-Chieh Chen et al., "DeepLab: Semantic Image Segmentation with Deep Convolutional Nets, Atrous Convolution, and Fully Connected CRFs", May 12, 2017, 14 pages.
Chinese Office Action dated Aug. 31, 2023 issued in counterpart application No. 201811361168.X, 22 pages.

* cited by examiner

METHOD AND APPARATUS FOR IMAGE SEGMENTATION

PRIORITY

This application is a National Phase Entry of International Application No. PCT/KR2019/015702, which was filed on Nov. 15, 2019, and claims priority to Chinese Patent Application No. 201811361168.X, filed in the Chinese Intellectual Property Office on Nov. 15, 2018, the entire content of each of which is incorporated herein by reference.

TECHNICAL FIELD

The present disclosure relates to the field of computer vision technology and artificial intelligence technology, more particularly, the subject matter is related to a method and apparatus for image segmentation.

BACKGROUND ART

The wave of artificial intelligence is sweeping the globe, and computer vision technologies are indispensable parts of artificial intelligence. The ultimate goal of computer vision is to enable computers to observe and perceive the world as human beings, of which the core task is to understand images. Among them, semantic segmentation is a higher-level task in scene understanding.

Semantic segmentation of an image requires classification of each pixel in image, and result of semantic segmentation may be used to obtain the types, shapes and sizes of objects in an image. For example, in an object segmentation task, a category ID in pixel level needs to be given to a pixel of an object in an image; and, for example, in a scene segmentation task, a category ID in pixel level needs to be given to all pixels in image.

There are many kinds of scenes for semantic segmentation, and the objects of semantic segmentation are various. At this time, how to obtain ideal segmentation effects for images with different characteristics becomes a key issue.

DISCLOSURE OF INVENTION

Solution to Problem

The present disclosure provides a method for image segmentation, an electronic device, and a computer readable storage medium, for enhancing segmentation effect of semantic segmentation.

In a first aspect, the present disclosure provides a method for image segmentation, comprising:

performing feature extraction on an image through a feature extraction network to obtain a feature map;

performing feature map processing on the feature map to complete semantic segmentation of the image.

In an alternative implementation, performing feature map processing on the feature map comprises:

performing feature map processing for at least two directions of the feature map.

In an alternative implementation, performing feature map processing for at least two directions of the feature map comprises:

performing convolution operation and/or pooling operation for the at least two directions of the feature map, respectively;

performing fusion processing on operation results of the at least two directions.

In an alternative implementation, performing convolution operation for the at least two directions of the feature map, comprises:

performing convolution operation for the at least two directions of the feature map, according to a convolution mode and/or a convolution parameter corresponding to each direction; and/or, performing pooling operation for the at least two directions of the feature map, comprises:

performing pooling operation for the at least two directions of the feature map, according to a pooling mode and/or a pooling parameter corresponding to each direction.

In an alternative implementation, before performing convolution operation for the at least two directions of the feature map, according to a convolution mode and/or a convolution parameter corresponding to each direction, further comprises:

determining a convolution mode and/or a convolution parameter corresponding to each direction, according to a device status and/or a task requirement.

In an alternative implementation, the at least two directions include a set main direction of the feature map;

before performing convolution operation for the at least two directions of the feature map, according to a convolution mode and/or a convolution parameter corresponding to each direction, further comprises:

determining convolution modes and/or convolution parameters corresponding to other directions, according to a convolution mode and/or a convolution parameter corresponding to the main direction of the feature map; and/or, before performing pooling operation for the at least two directions of the feature map, according to a pooling mode and/or a pooling parameter corresponding to each direction, further comprises:

determining pooling modes and/or pooling parameters corresponding to other directions, according to a pooling mode and/or a pooling parameter corresponding to the main direction of the feature map.

In an alternative implementation, the convolution parameter comprises at least one of a convolution kernel size, a dilation rate, a convolution step size, and a parameter amount; and/or, the pooling parameter comprises at least one of a pooling kernel size and a pooling step size.

In an alternative implementation, performing fusion processing on operation results of the at least two directions comprising any one of the following cases:

performing fusion processing on a convolution operation result of each direction, if performing convolution operation for the at least two directions of the feature map respectively;

performing fusion processing on a pooling operation result for each direction, if performing pooling operation for the at least two directions of the feature map respectively;

performing fusion processing on a convolution operation result and a pooling operation result of each direction, if performing convolution operation and pooling operation for the at least two directions of the feature map simultaneously and respectively;

performing fusion processing on a pooling operation result for each direction, if performing convolution operation and pooling operation for the at least two directions of the feature map successively and respectively.

In an alternative implementation, performing fusion processing on operation results of the at least two directions, comprises:

determining a fusion weight and/or feature offset information corresponding to each operation result respectively, for each of operation results of the at least two directions;

performing a predetermined processing on each operation result according to the fusion weight and/or the feature offset information;

performing fusion processing on each operation result passing through a predetermined processing.

In an alternative implementation, before performing fusion processing on each operation result passing through a predetermined processing, further comprises:

performing a skip connection processing on the operation result and an output result of the operation result in which passing through a predetermined processing, respectively, for each of operation results of the at least two directions;

performing fusion processing on each operation result passing through the predetermined processing, comprising:

performing fusion processing on each operation result passing through the skip connection processing.

In an alternative implementation, performing a predetermined processing on each operation result according to the fusion weight and/or the feature offset information, comprises at least one of the following items:

performing weighting processing on each operation result respectively, according to the fusion weight;

performing weighting processing on each weighting-processed output result respectively, according to the fusion weight;

performing weighting processing on each offset-processed output result respectively, according to the fusion weight;

performing weighting processing on each skip-connection-processed output result respectively, according to the fusion weight;

performing offset processing on each operation result respectively, according to the feature offset information;

performing offset processing on each weighting-processed output result respectively, according to the feature offset information;

performing offset processing on each offset-processed output result respectively, according to the feature offset information;

performing offset processing on each skip-connection-processed output result respectively, according to the feature offset information.

In an alternative implementation, the method further comprises:

determining corresponding channel correlation features according to a feature map obtained by combining operation results of the at least two directions;

determining a fusion weight corresponding to each operation result, comprises:

determining a fusion weight corresponding to each of the operation results of the at least two directions respectively, according to the channel correlation features;

determining feature offset information corresponding to each operation result, comprises:

determining feature offset information corresponding to each of the operation results of the at least two directions respectively, according to the channel correlation features.

In an alternative implementation, performing feature extraction on an image to obtain a feature map, comprises:

Step 1: performing, for a set convolution layer in the feature extraction network, a convolution processing on the image or an input feature map according to a convolution parameter corresponding to the set convolution layer;

Step 2: performing feature map processing on a feature map obtained by convolution processing to obtain a category probability feature map, and determining a category confidence according to the category probability feature map;

Step 3: if confirming that it is necessary to adjust the convolution parameter corresponding to the set convolution layer based on the category confidence, adjusting the convolution parameter corresponding to the set convolution layer and then performing Step 1, and if confirming that it is not necessary to adjust the convolution parameter corresponding to the set convolution layer based on the category confidence, outputting a feature map obtained by convolution processing.

In an alternative implementation, the set convolution layer is at least one convolution layer whose depth is greater than a second depth threshold, in at least one feature extraction module whose depth is greater than a first depth threshold.

In an alternative implementation, confirming whether it is necessary to adjust the convolution parameter corresponding to the set convolution layer in the following manners:

when the category confidence is greater than a first predetermined threshold, confirming that it is not necessary to adjust the convolution parameter corresponding to the set convolution layer; otherwise, confirming that it is necessary to adjust the convolution parameter corresponding to the set convolution layer.

In an alternative implementation, the method further comprises:

if total number of iterations are not less than a first predefined iteration number threshold, and/or number of iterations of the set convolution layer is not less than a second predefined iteration number threshold, confirming that it is not necessary to adjust the convolution parameter corresponding to the set convolution layer, and outputting a feature map obtained by convolution processing.

In an alternative implementation, adjusting a convolution parameter corresponding to the set convolution layer, comprises:

determining a parameter variation corresponding to the set convolution layer;

adjusting a convolution parameter corresponding to the set convolution layer based on the parameter variation.

In an alternative implementation, determining a parameter variation corresponding to the set convolution layer, comprises:

determining a parameter variation corresponding to the set convolution layer, according to the category confidence.

In an alternative implementation, performing feature extraction on the image to obtain a feature map comprising:

performing receptive field processing on the feature map extracted by a set feature extraction module, by at least one receptive field processing module, to obtain the receptive-field-processed feature map.

In an alternative implementation, the receptive field processing module contains at least one receptive field processing branch;

performing receptive field processing by any one receptive field processing module, comprising:

performing convolution processing on the feature map output by the set feature extraction module or a previous receptive field processing module, by each receptive field processing branch of a current receptive field processing module respectively, to obtain each convolved feature map; and performing fusion processing on each convolved feature map, based on a weight corresponding to each receptive field processing branch of the current receptive field processing module.

In an alternative implementation, convolution parameter amount used in the convolution processing by each receptive field processing branch of any one receptive field processing module is the same.

In an alternative implementation, the set feature extraction module comprising any one of the following:

any one feature extraction module in a feature extraction network; and any one feature extraction module, whose depth is greater than a third deep threshold, in the feature extraction network.

In an alternative implementation, performing feature extraction on the image to obtain a feature map, comprising:

performing feature map processing on a feature map extracted by a current feature extraction module to obtain a category probability feature map, and determining a category confidence according to the category probability feature map;

if confirmed that it is necessary to enter a next feature extraction module for feature extraction based on the category confidence, outputting a feature map extracted by a current feature extraction module to a next feature extraction module, and if confirmed that it is not necessary to enter a next feature extraction module for feature extraction based on the category confidence, outputting a feature map extracted by a current feature extraction module as a feature map output by the feature extraction network or outputting a category probability feature map.

In an alternative implementation, confirming whether it is necessary to ender a next feature extraction module for feature extraction in the following manners:

when the category confidence is greater than a second predetermined threshold, confirming that it is not necessary to ender a next feature extraction module for feature extraction; otherwise, confirming that it is necessary to ender a next feature extraction module for feature extraction.

In an alternative implementation, determining a category confidence according to the category probability feature map, comprises:

determining a maximum probability of each pixel in the category probability feature map;

determining a category confidence based on an average of the maximum probability of each pixel.

In an alternative implementation, performing feature extraction on the image to obtain a feature map comprises:

inputting a feature map obtained based on a current feature extraction module and a category prediction result obtained based on a current feature extraction module, to a next feature extraction module for feature extraction.

In an alternative implementation, inputting a feature map obtained based on a current feature extraction module and a category prediction result obtained based on a current feature extraction module, to a next feature extraction module for feature extracting, comprises:

the feature map obtained based on a current feature extraction module and the category prediction result obtained based on a current feature extraction module are fused and input to a next feature extraction module for feature extraction.

In an alternative implementation, the method further comprises the step of: when performing offline training on each model used in a semantic segmentation process, the employed D loss function (Dloss) is:

$$L(x, c) = \frac{1}{N}(L_{conf}(x, c))$$

$$L_{conf}(x, c) = -\sum_{i \in Pos}^{N} x_{ij}^p \log(\hat{c}_i^p) - \sum_{i \in Neg} \log(\hat{c}_i^0) \text{ where}$$

$$\hat{c}_i^p = \frac{\exp(c_i^p)}{\sum_p \exp(c_i^p)}$$

wherein, N is the total number of pixels in the image, i is the predicted category, j is the actual category, $c_i$ is the probability that a pixel belongs to the category i, p is the category whose prediction is consistent with the reality, $x_{ij}^p = \{1, 0\}$, indicating whether the prediction category is consistent with the reality.

Then, in offline training, the total target loss function is:

Loss=Segloss+α*Dloss wherein, Segloss is the standard cross-entropy loss function, and α is the balance weight of Dloss and Segloss.

In the second aspect, the present disclosure provides an electronic device, comprising:

a feature extraction module, for performing feature extraction on an image through a feature extraction network to obtain a feature map;

a feature map processing module, for performing feature map processing on the feature map to complete semantic segmentation of the image.

In the third aspect, the present disclosure provides an electronic device, comprising:

a processor and a memory, the memory storing at least one instruction, at least one program, a code set, or a set of instructions, and the at least one instruction, the at least one program, the code set, or the set of instructions being loaded by the processor and executed to implement the method for image segmentation according to the first aspect of the present disclosure In the fourth aspect, the present disclosure provides a computer readable storage medium, wherein the computer storage medium is for storing computer instructions, programs, code sets, or sets of instructions, which, when executed on a computer, enables the computer to perform the method for image segmentation according to the first aspect of the present disclosure.

The beneficial effects of the technical solutions provided by the present disclosure are:

In the present disclosure feature extraction on an input image is used to obtain a feature map; then the feature map is processed by feature map processing to complete the semantic segmentation, such that performance of the semantic segmentation is effectively improved.

In the present disclosure, the feature map processing is performed for at least two direction of the feature map. While performing feature map processing on the feature map extracted by the feature extraction network, the processing is not a convolution operation in a signal direction, but a feature map processing for multiple directions of the feature map, such as the convolution operation and/or pooling operation. Such that, the size of the convolution kernel is not increased, and the results for convolution operations on different regions of the object is consistent. For a certain object, convolution is performed not only in forward direction of the feature map, but also in other directions, in which convolution may assist to cover the entire object from the forward direction, such that higher level feature information may be obtained. In other word, when the convolution operation is performed in up-down direction or left-right direction, each convolution operation may cover a larger region from the front view, such that accuracy and stability when segmenting an object of a specific shape may be improved.

The present disclosure also performs fusion processing on the operation results of the at least two directions in feature map processing. Compared with existing fusion modes, feature offset information and a fusion weight corresponding to each operation result may be used to enhance effective information of operation result to suppresses the unnecessary information in the feature map, and a skip connection processing may be used to maintain detailed information of an output category ID map, thereby effectively improving feature fusion effect and accuracy of semantic segmentation result.

In the present disclosure, a set convolution layer is used to obtain a category confidence through convolution operation, convolution parameters of the convolution layer may be adaptive adjusted online, and convolution parameters of the convolution layer may be adjusted to the most suitable size, thereby the adjusted convolution parameters being capable of better covering an object in the image as far as possible with more accurately extraction of object features accordingly, which may avoid excessive noise information and accuracy reducing problem of feature extraction when receptive field in the convolution parameters is too large, and may also avoid problem of inability to completely cover an entire object when receptive field in the convolution parameters is too small, effectively improving accuracy of features extracted from objects of different sizes, and thus improving segmentation accuracy of semantic segmentation and also stability of segmentation.

The present disclosure also provides that a feature extraction module participating in online prediction may be adaptively determined, and a network structure may be adaptively adjusted online, that is, according to category confidence of the current feature extraction result, it is to determine whether to skip a subsequent feature extraction module, to directly perform a feature-map processing or directly output the prediction result, so that the final result may be output only through several layers of networks, and when a simple image is segmented, fewer feature extraction module may be adaptively used for feature extraction, which may save computational complexity and speed up network computing.

The present disclosure also uses a prediction result inferred by a shallow layer module as another input of the deep network, and the preliminary result of the shallow layer network comprises semantic information between objects, by which a deep network may be guided to extract more spatial and semantic information thereby reducing the prediction region, and the usage of prediction result of a shallow extraction module to guide a deep extraction module improves accuracy of the feature extracted by the feature extraction network and improves the accuracy of semantic segmentation.

The present disclosure also provides that the number of channels of a convolution layer of a deep layer network in the feature extraction network may be correspondingly reduced without losing segmentation accuracy, that is, the number of channels of a convolution layer of a deep feature extraction module may be correspondingly reduced, for example, the number of channels of the convolution layer in the set feature extraction module in the extraction network is smaller than a predefined channel number threshold, wherein the set feature extraction module may be at least one feature extraction module whose depth is greater than a third depth threshold. This network design may save the computational amount of semantic segmentation and speed up network computing.

The present disclosure also uses information between objects to enhance segmentation effect of objects of fewer categories, and provides a new loss function Dloss, which may increase the weight of difficult-to-predict categories, so that a training process pays more attention to categories including small numbers or samples of categories that are more difficult to segment, thereby effectively improving the overall semantic segmentation accuracy.

BRIEF DESCRIPTION OF DRAWINGS

In order to more clearly illustrate technical solutions of embodiments of the present disclosure, the drawings used in the description of the embodiments of the present disclosure will be briefly described below.

BEST MODE FOR CARRYING OUT THE INVENTION

Figure 1A:
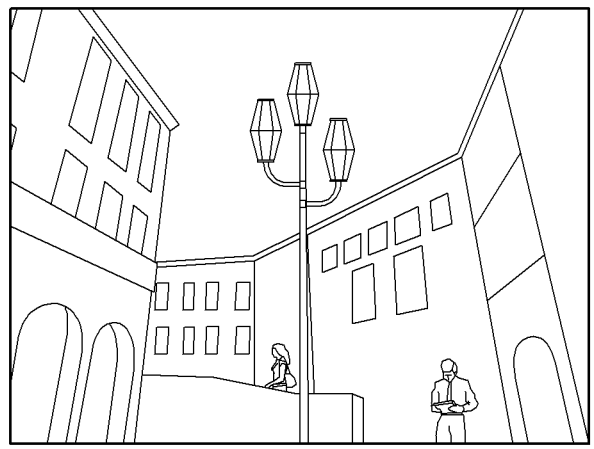
FIG. 1A is an exemplary diagram illustrating an example of an object having a large longitudinal dimension provided by an embodiment of the present disclosure.

Embodiments of the present invention will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present invention and should not be regarded as any limitations thereto.

It should be understood by those skill in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

The inventors of the present disclosure found that semantic segmentation in the prior art has the following four types of difficulties:

Difficulty I: segmentation effect for an object of a specific shape is not ideal, and segmentation accuracy is low.

This is because convolution manners employed by current methods for semantic segmentation may not cover an entire object in an image, but segment an entire object into small blocks for convolution processing, which causes the problem that object prediction consistency is poor, that is, object categories predicted by pixels belonging to the same object are inconsistent, for example, increasing possibility that prediction of one object at both ends is correct and prediction of the middle part is incorrect.

As an example, there may be some objects of specific shapes in the image in which semantic segmentation is performed. These objects of specific shapes may have relatively large sizes in certain directions of the image, for example, an object having a relatively large size in longitudinal direction of an image (for example, a higher object, etc.), or an object having a relatively large size in lateral direction of an image (for example, a wider object, etc.).

Figure 1B:
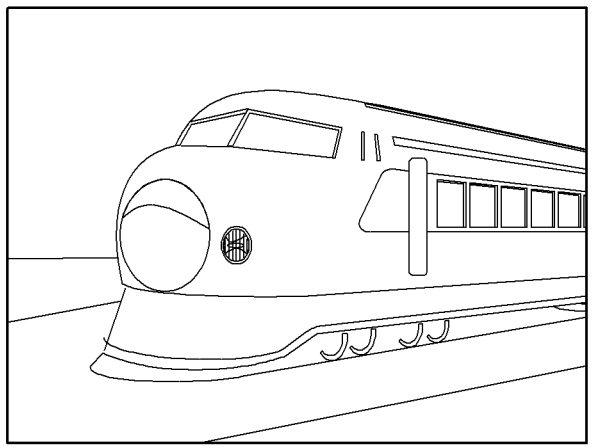
FIG. 1B is an exemplary diagram illustrating an example of an object having a large lateral dimension provided by an embodiment of the present disclosure.

For example, as shown in FIG. 1A, the size of the street lamp of the image is large in longitudinal direction, and the size of the train in FIG. 1B is relatively large in horizontal direction of the image, which cause the result of segmenting these objects having specific shapes by using the existing semantic segmentation method is often not ideal, and segmentation accuracy when segmenting these objects is low.

Difficulty II: for objects of same category presenting on different images, since sizes or shapes of objects are different on images, segmentation effects are unstable and performance is not robust.

This is because, when defining structure of semantic segmentation network, a size and parameters of a convolution kernel are fixed, which indicates that a receptive field of the convolution processing is also fixed. However, for objects of different sizes, if a same receptive field size is used, it will make the structure of the semantic segmentation network difficult to cover objects of various sizes.

Figure 2A:
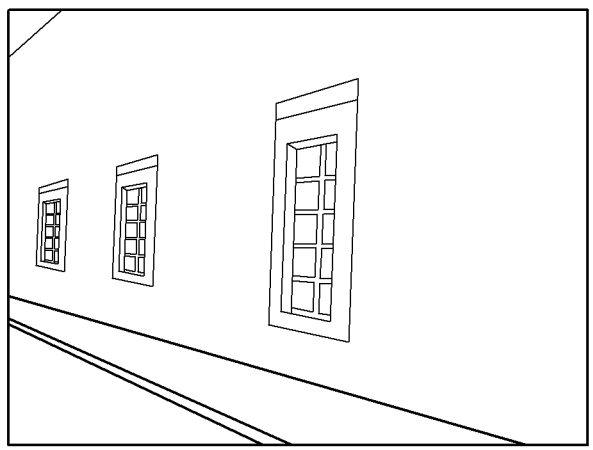
FIG. 2A is an exemplary diagram illustrating a bicycle provided by an embodiment of the present disclosure showing smaller in the Figure.
Figure 2B:
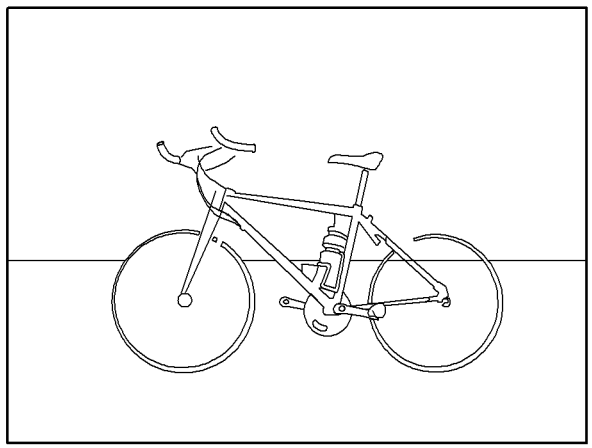
FIG. 2B is an exemplary diagram illustrating a bicycle provided by an embodiment of the present disclosure showing larger in the Figure.

For example, as shown in FIG. 2A and FIG. 2B, the bicycles are different in size in the two Figures. When the objects whose sizes having significant difference on different images are semantically segmented by using the prior art, segmentation effect is not ideal, and segmentation accuracy is low.

Difficulty III: It is difficult to efficiently segment a simple image in a fixed network structure.

Figure 3A:
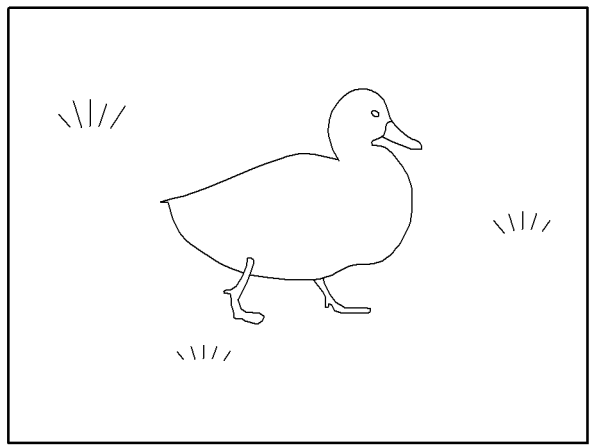
FIG. 3A is an exemplary diagram illustrating a simple image provided by an embodiment of the present disclosure.

The prior art uses a fixed network structure to semantically segment all of input images. For example, the input image may be as shown in FIG. 3A, and the image is a simple image including a certain animal. The prior art performs a semantic segmentation processing on the simple image through a semantic segmentation network having a fixed structure to obtain an object ID corresponding to each pixel in the image; for example, the input image may also be as shown in FIG. 3B, which is a complex image containing information such as people, stripes, pits and the like, and the prior art performs semantic segmentation processing on the complex image through a semantic segmentation network having the fixed structure to obtain an object ID corresponding to each pixel in the image.

Figure 3B:
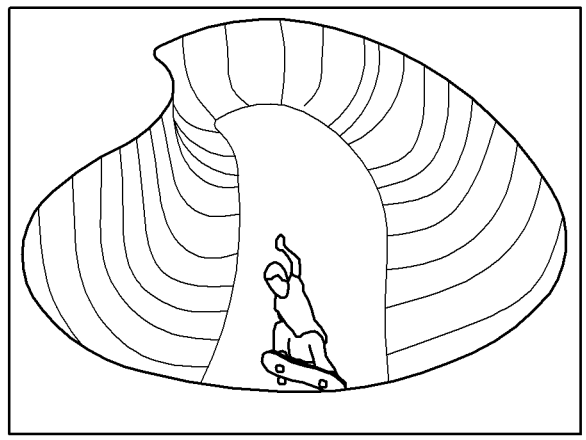
FIG. 3B is an exemplary diagram illustrating a complex image provided by an embodiment of the present disclosure.

It may be seen from the above that some images have relatively simple scenes, or the number of objects is relatively small or object categories are relatively simple, for example, the simple image shown in FIG. 3A, while some scenes of images are more complicated, or the number of objects is more, or object categories are more complicated, for example, the complex image shown in FIG. 3B. In the prior art, when semantic segmentation on different images is performed, the same fixed structure network model is employed, that is, a large complete network for processing complex images is still used when processing simple images, which consumes a large amount of computing time and computing resources.

Difficulty IV: distribution of objects of different categories in training data is extremely uneven, and performance of segmented network model obtained by offline training of such training data is not ideal.

The uneven distribution of training data means that the number of data samples in each category varies greatly in a training data set. Semantic segmentation is a pixel-level category prediction, so the number of samples is counted according to the number of pixels, not the number of images. For example, in training data distribution of a certain typical data set, object categories include background and 20 types of objects, wherein background category occupies most of sum of pixels of the majority of entire training set, while object categories with least sum of pixels only account for less than 1% of total sum of pixels. In a data set with a larger number of categories, although there are more object categories, such as 150 types of objects, uneven distribution of data is more serious.

For training sets with severely uneven data distribution, techniques of the prior art usually use mining techniques for pixel-level difficult samples, making pixels ignore information elements that are parts of objects, which causes prediction results to be mottled, such that segmentation effect is not ideal, and segmentation result is less accurate, when a semantic segmentation is performed on the image by semantic segmentation network obtained through training.

Based on this, the present disclosure provides a method for image segmentation, an electronic device, and a computer readable storage medium, aiming at solving the above technical problems.

In order to make the purpose, technical solutions, and advantages of the present disclosure more clearly, the present disclosure will be described in detail in conjunction with accompanying drawings and specific embodiments hereinafter.

Figure 4:
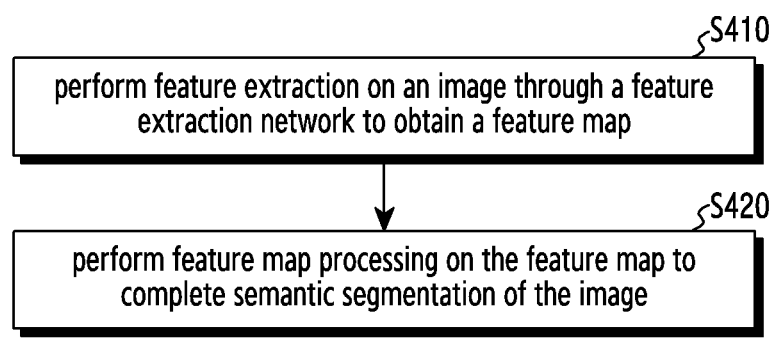
FIG. 4 is a schematic flowchart of a method for image segmentation provided by an embodiment of the present disclosure.

An embodiment of the present invention provides a method for image segmentation, and as shown in FIG. 4, the method comprises that:

Step S410: performing feature extraction on an image through a feature extraction network to obtain a feature map.

Step S420: performing feature map processing on the feature map to complete semantic segmentation of the image.

Figure 5:
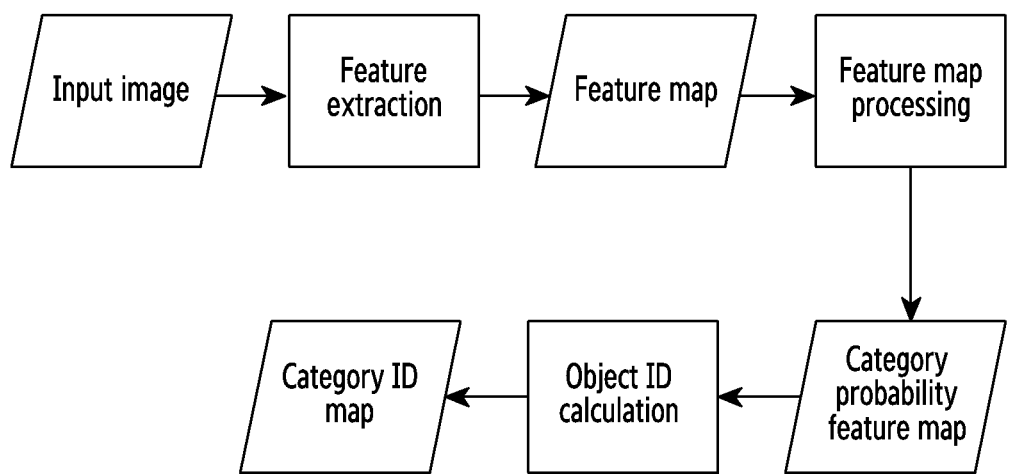
FIG. 5 is an overall schematic flowchart for completing semantic segmentation provided by an embodiment of the present disclosure.

In practical application, an overall flowchart for completing semantic segmentation is shown as in FIG. 5: performing Step S410 through a feature extraction network, performing feature extraction on an image to obtain a feature map; performing step S420 according to the obtained feature map, performing feature map processing on the feature map for outputting a category probability feature map; each feature value in the category probability feature map represents a probability value of a corresponding pixel belonging to a certain object category or a certain scene category; performing ID calculation on the category probability feature map to obtain a category ID map, i.e. determining the category ID of the maximum probability corresponding to each pixel.

In an alternative implementation, Step S420 specifically comprises: performing convolution operation on a feature map by using one or more convolution kernels, and performing fusion processing on the obtained feature maps after convolution operation to obtain a category probability feature map. During convolution operation on the feature map, a pooling processing may also be performed on the feature map at the same time. During fusion processing, the obtained feature map after convolution processing and the obtained feature map after pooling processing are fused to obtain a category probability feature map. The pooling operation is an alternative operation during feature map processing.

Figure 6:
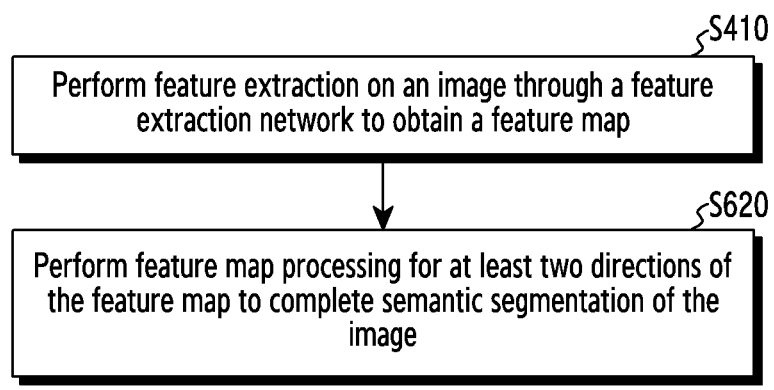
FIG. 6 is a schematic flowchart of another method for image segmentation provided by an embodiment of the present disclosure.

In a preferred implementation, as shown in FIG. 6, Step S420 includes Step S620. Wherein, the Step S410 in FIG. 6 may be the same as the step S410 in FIG. 4, and may be the same as the step S710 in FIG. 7 below, for which the specific implementations thereof may be referred to the introduction of step S410 or step S710, and details are not described herein again. In particular, Step S620: performing feature map processing for at least two directions of the feature map to complete semantic segmentation of the image.

The directions of the feature map include a front-rear direction, an up-down direction, and a left-right direction.

In this implementation, Step S620 specifically includes Step S6201 (not shown in Figure) and Step S6202 (not shown in Figure). Specifically, Step S6201: performing convolution operation and/or pooling operation for at least two directions of the feature map respectively; Step S6202: performing fusion processing on the operation results of at least two directions.

Specifically, performing convolution operation for at least two directions of the feature map in Step S6201 comprises: performing convolution operation for the at least two directions of the feature map, according to a convolution mode and/or a convolution parameter corresponding to each direction;

and/or, performing pooling operation for the at least two directions of the feature map in Step S6201, comprises: performing pooling operation for the at least two directions of the feature map, according to a pooling mode and/or a pooling parameter corresponding to each direction.

Wherein, before performing convolution operation for the at least two directions of the feature map, according to a convolution mode and/or a convolution parameter corresponding to each direction, further comprises: determining a convolution mode and/or a convolution parameter corresponding to each direction, according to a device status and/or a task requirement.

In practical application, convolution modes and convolution parameters corresponding to each predefined direction may be obtained respectively, and pooling modes and pooling parameters corresponding to each predefined direction may be obtained.

Specifically, the at least two directions comprises a set main direction of the feature map.

Then, before performing convolution operation for the at least two directions of the feature map, according to a convolution mode and/or a convolution parameter corresponding to each direction, further comprises: determining convolution modes and/or convolution parameters corresponding to other directions, according to a convolution mode and/or a convolution parameter corresponding to the main direction of the feature map;

and/or, before performing pooling operation for the at least two directions of the feature map, according to a pooling mode and/or a pooling parameter corresponding to each direction, further comprises: determining pooling modes and/or pooling parameters corresponding to other directions, according to a pooling mode and/or a pooling parameter corresponding to the main direction of the feature map.

Specifically, the convolution parameter comprises at least one of a convolution kernel size, a dilation rate, a convolution step size, and a parameter amount;

the pooling parameter comprises at least one of a pooling kernel size and a pooling step size.

Further, in Step S6202, performing fusion processing on operation results of the at least two directions comprise any one of the following cases:

performing fusion processing on a convolution operation result of each direction, if performing convolution operation for the at least two directions of the feature map respectively;

performing fusion processing on a pooling operation result of each direction, if performing pooling operation for the at least two directions of the feature map respectively;

performing fusion processing on a convolution operation result and a pooling operation result of each direction, if performing convolution operation and pooling operation for the at least two directions of the feature map simultaneously and respectively;

performing fusion processing on a pooling operation result of each direction, if performing convolution operation for the at least two directions of the feature map first, and then performing pooling operation based on the convolution result (that is, performing the convolution operation and pooling operation in sequence).

For a better fusion effect, Step S6202 may be implemented by the following manner: determining a fusion weight and/or feature offset information corresponding to each operation result respectively, for each operation result in the operation results for the at least two directions; performing a predetermined processing on each the operation result according to the fusion weight and/or the feature offset information respectively; performing fusion processing on each operation result passing through a predetermined processing.

Alternatively, before performing fusion processing on each operation result passing through a predetermined processing, further comprises: performing a skip connection processing on the operation result and an output result of the operation result in which passing through a predetermined processing, respectively, for each of operation results of the at least two directions;

then, performing fusion processing on each operation result passing through the predetermined processing, comprises: performing fusion processing on each skip-connection-processed operation result.

Specifically, performing a predetermined processing on each operation result according to the fusion weight and/or the feature offset information, comprises at least one of the following items:

performing weighting processing on each operation result respectively, according to the fusion weight;

performing weighting processing on each weighting-processed output result respectively, according to the fusion weight;

performing weighting processing on each offset-processed output result respectively, according to the fusion weight;

performing weighting processing on each skip-connection processed output result respectively, according to the fusion weight;

performing offset processing on each operation result respectively, according to the feature offset information;

performing offset processing on each weight-processed output result respectively, according to the feature offset information;

performing offset processing on each offset-processed output result respectively, according to the feature offset information;

performing offset processing on each skip-connection-processed output result respectively, according to the feature offset information.

In practical application, the method further comprises: determining corresponding channel correlation features according to a feature map obtained by combining operation results of the at least two directions;

then, determining a fusion weight corresponding to each operation result comprises:

determining a fusion weight corresponding to each of the operation results of the at least two directions respectively, according to the channel correlation features;

and, determining feature offset information corresponding to each operation result, comprises: determining feature offset information corresponding to each of the operation results of the at least two directions respectively, according to the channel correlation features.

This preferred implementation may overcome the following problems compared with using a unidirectional convolution operation when performing feature map processing:

during performing feature map processing, the existing methods uses the unidirectional convolution operation (wherein, the present disclosure may refer to this direction as a front-rear direction, or a forward direction), that is, using one or more convolution kernels to perform convolution processing on a 3D feature map extracted by the feature extraction network in forward direction. In this convolution mode, when convolution calculation is performed on a certain feature layer in the feature map, only feature values of local regions (the size of local regions is related to the size of the convolution kernel) in the current layer is used for convolution operation, and the output result of the convolution operation corresponds to the local regions. When using the same convolution kernel to perform convolution operation on different regions of the same object, the output result may be different.

The inventors of the present disclosure have found that for an object of a specific shape (for example, an object of a relatively large size in a certain direction of an image), even if a size of a convolution kernel is increased, one-time convolution operation may not effectively cover the complete region of an object. For such an object of a specific shape, it is often necessary to perform multiple convolution operations for each local region of the object, and results of convolution operation for each local region may be different, the object category corresponding to the pixels in different regions that are finally determined may be different, which may result in inaccurate segmentation results for some pixels of the object. As an example, in a certain image, if both region 1 and region 2 belong to object A, the result obtained by performing convolution operation on region 1 and the result obtained by performing convolution operation on region 2 by using the same convolution kernel may be different, then the final segmentation results of pixels of each region may be different.

For example, for the street lamp in FIG. 1A, when performing convolution operation on each layer of the feature map, one-time convolution operation may not be performed on the entire region of the street lamp through one convolution kernel, therefore requires multiple convolution operations, which then the street lamp is bound to be segment into a plurality of regions, and object categories of pixels in different regions that are subsequently obtained may be different, which may result in inaccurate segmentation results of some pixels of the street lamp.

It is also possible to increase size of a convolution kernel in order to increase the effective coverage region of each convolution operation, but for these objects of specific shapes, even if increased the size of the convolution kernel, it is difficult to cover the entire region of the object through one convolution operation. In addition, if the region covered by one convolution operation is too large, each convolution operation may introduce some background information (for example, for tall and thin objects), so it is difficult to obtain accurate segmentation results.

Since an object of a specific shape may exist in an image, for example, an object having a relatively large size in a certain direction of the image, the existing feature map processing is difficult to obtain an accurate semantic segmentation result, that is, semantic segmentation effect is not ideal, and segmentation accuracy is low. For this, the present disclosure provides a method for multi-directional feature map processing, in which during feature map processing, convolution operation is performed for a feature map extracted by a feature extraction network in multiple directions (at least two directions) rather than in a single direction. In present application, for fusion processing on operation results during feature map processing, a method is also provided for channels fusion of multi-gate-controlled feature, which firstly performing offset processing and/or weighting processing on operation results during feature map processing, and then performing a fusion of the processed results.

Through the method for multi-directional feature map processing provided by the present disclosure, operation results of different regions of an object may be made uniform without increasing the size of convolution kernel. For a certain object, the feature map processing may be performed in at least two directions, for example, not only in forward direction of the feature map, but also in other directions, and the convolution in other directions may assist to cover the entire object in forward direction, thus enabling higher levels of feature information. That is to say, when convolution operation is performed in up-down direction or left-right direction, each convolution operation may cover a larger region from the front view, such that accuracy and stability when segmenting an object of a specific shape may be improved.

In addition, through the method for multi-gate controlled channel fusion provided by the present disclosure, compared with existing fusion mode, effective information in operation results may be enhanced by using feature offset information and fusion weight corresponding to each operation result to suppress unnecessary information in the feature map, and output detailed information of category ID map may also be maintained by a skip connection processing, thereby effectively improving feature fusion effect and accuracy of semantic segmentation result.

In an alternative implementation, Step S410 may comprise step 1, step 2, and step 3, wherein, Step 1 (not shown in Figure): performing, for a set convolution layer in the feature extraction network, convolution processing on the image or an input feature map according to a convolution parameter corresponding to the set convolution layer;

Step 2 (not shown in Figure): performing feature map processing on a feature map obtained by convolution processing to obtain a category probability feature map, and determining a category confidence according to the category probability feature map;

Step 3 (not shown in Figure): if confirming that it is necessary to adjust the convolution parameter corresponding to the set convolution layer based on the category confidence, adjusting an convolution parameter corresponding to the set convolution layer and then performing Step 1, and if confirming that it is not necessary to adjust the convolution parameter corresponding to the set convolution layer based on the category confidence, outputting a feature map obtained by convolution processing.

In practical application, in Step 1, if the set convolution layer is the first convolution layer of a first feature extraction module, then convolution processing is performed on the original image to be semantically segmented, and if the set convolution layer is not the first convolution layer of a first feature extraction module, then a convolution layer, or the pooling layer, or the batch normalization layer of previous layer is output, and convolution processing is performed on the feature map input at the set convolution layer.

The above set convolution layer is at least one convolution layer whose depth is greater than a second depth threshold, in at least one feature extraction module whose depth is greater than a first depth threshold.

The set convolution layer may be determined in the following manner: selecting at least one key convolution layer from at least one feature extraction module as the set convolution layer, wherein the set convolution layer is the key convolution layer whose depth is greater than a first depth threshold in the feature extraction module;

Wherein, the manner for determining the key convolution layer comprises: selecting at least one convolution layer as the key convolution layer from feature extraction modules, wherein the key convolution layer is a convolution layer whose depth is greater than a second depth threshold in the feature extraction module.

The embodiment of the present disclosure provides that a set convolution layer may be predetermined, for example, when constructing a semantic segmentation network, it may be determined that which convolution layers of which feature extraction modules are served as a set convolution layer.

In Step 2, determining a category confidence according to the category probability feature map, comprises: determining a maximum probability of each pixel in the category probability feature map; determining a category confidence based on an average of the maximum probability of each pixel.

Alternatively, Step 3 may confirm whether it is necessary to adjust the convolution parameter corresponding to the set convolution layer in the following manners: when the category confidence is greater than a first predetermined threshold, confirming that it is not necessary to adjust the convolution parameter corresponding to the set convolution layer; otherwise, confirming that it is necessary to adjust the convolution parameter corresponding to the set convolution layer.

Alternatively, the above step 3 may further comprises: if the total number of iterations are not less than a first predefined iteration number threshold, and/or the number of iterations of the set convolution layer is not less than a second predefined iteration number threshold, confirming that it is not necessary to adjust the convolution parameter corresponding to the set convolution layer, and outputting a feature map obtained by convolution processing.

In practical applications, if there are sufficient computing resources, the number of iterations may not be set.

In step 3, adjusting a convolution parameter corresponding to the set convolution layer, comprises: determining a parameter variation corresponding to the set convolution layer; adjusting a convolution parameter corresponding to the set convolution layer based on the parameter variation.

Further, determining a parameter variation corresponding to the set convolution layer, comprises: determining a parameter variation corresponding to the set convolution layer, according to the category confidence.

Alternatively, the parameter variation corresponding to the set convolution layer may also be a predefined fixed value.

For convenience of description below, this scheme for feature extraction may be simply referred to as an adaptive receptive field mode.

This scheme for feature extraction using the adaptive receptive field mode may overcome the following problems compared with feature extraction using a fixed receptive field:

in semantic segmentation process, there are abundant sizes of objects in the input image. In a feature extraction network, a receptive field of a certain convolution layer means that the range affected by the convolution operation in the convolution layer corresponds to the size in the input image, and the receptive field are mainly determined by convolution parameters (for example, convolution kernel size (i.e. the size of convolution kernel) or dilation rate, etc.). A large receptive field may better cover a large-sized object and accurately extract features of such object, but for a small-sized objects, excessive noise information is introduced to reduce the accuracy of feature extraction; on the contrary, a small receptive field may better cover a small-sized object and accurately extract features of such object, but for a large-sized object, such object may not be completely covered, resulting in incomplete feature extraction and decline of performance.

In theory, when segmenting objects of different sizes and shapes, different receptive fields are needed, and the receptive fields have to cover the objects to be segmented. For a large-sized object, if a receptive field is too small, prediction of an object region may be wrong. For a small-sized object, if a receptive field is too large, a non-object region may be predicted as an object. However, in the existing methods, receptive fields are predefined and fixed, therefore the existing methods need to use a large number of training sample images with different sizes to train the feature extraction network in order to better segment objects of different sizes, such that the network learn object information of different sizes as much as possible and then make up for the problems caused by the fixed receptive field. However, the existing methods are very resource-intensive, and difference in size and shape of objects in same category on different images may be relatively large. As shown in FIG. 2A and FIG. 2B, the existing methods are difficult to cover all cases with limited improved accuracy.

For objects belonging to same category but different in size or shape on different images, the present disclosure provides a method for adaptive receptive field adjustment, comprising: adjusting a size of receptive field adaptively and online, through a category confidence obtained by convolution operation of a convolution layer, and adjusting the size of receptive field of the convolution layer to the most suitable size, such that the adjusted receptive field may cover objects in images as much as possible, thereby accurately extracting object features and also avoiding introducing too much noise information. Through the above method for adaptive receptive field adjustment, it is possible to avoid the problem of introducing excessive noise information thereby reducing accuracy of feature extraction, when a receptive field is too large, and the problem of incompletely cover of an entire object thereby resulting in incomplete of feature extraction, when a receptive field is too small. The above method for adaptive receptive field adjustment may improve accuracy of features extracted from objects of different sizes, through feature extraction on an image by real-time adjustment of the convolution operation of receptive field, thereby improving segmentation accuracy of semantic segmentation and stability of segmentation.

In still another alternative implementation, Step S410 may comprise: Step 4 and Step 5, wherein, the feature extraction network may include several feature extraction modules, each of which is composed of several network layers (such as a convolution layer, a pooling layer, a batch normalization layer, etc.).

Step 4 (not shown in Figure): performing feature map processing on a feature map extracted by a current feature extraction module to obtain a category probability feature map, and determining a category confidence according to the category probability feature map;

Step 5 (not shown in Figure): If confirmed that it is necessary to enter a next feature extraction module for feature extraction based on the category confidence, outputting a feature map extracted by a current feature extraction module to a next feature extraction module, and if confirmed that it is not necessary to enter a next feature extraction module for feature extraction based on the category confidence, outputting a feature map extracted by a current feature extraction module as a feature map output by the feature extraction network or outputting the category probability feature map obtained in Step 4.

Alternatively, in Step 5, it may be confirmed whether it is necessary to enter a next feature extraction module for feature extraction in the following manners: when the category confidence is greater than a second predetermined threshold, confirming that it is not necessary to enter a next feature extraction module for feature extraction; otherwise, confirming that it is necessary to enter a next feature extraction module for feature extraction.

In step 4, determining a category confidence according to the category probability feature map, comprises: determining a maximum probability of each pixel in the category probability feature map; determining a category confidence based on an average of the maximum probability of each pixel.

For convenience of description below, this extraction feature scheme is simply referred to as an adaptive cascade prediction mode.

This extraction feature scheme using adaptive cascade prediction may overcome the following problems compared with feature extraction using a fixed network structure in the prior art:

Network structures of the existing feature extraction networks are all fixed. Moreover, in order to ensure input of complex images (the scene is more complicated, or the number of objects is more, or the image whose the category of object is more complicated), a network design will be relatively deeper and larger. When segmenting simple images, it is still necessary to use a large complete network for processing complex images, which is unnecessary for simple images and consumes a lot of computation time and computation resources.

Aiming at the problems that a fixed network structure is used in all the images in the prior art thereby causing low network processing efficiency, the present disclosure provides a method for an online adaptive cascade prediction mode, which may adaptively determine the feature extraction module deciding to participate in online prediction, that is, according to category confidence of the current feature extraction result, determining whether to skip the subsequent feature extraction module, to directly perform a feature map processing step or directly output the prediction result, such that the final result may be output only through several layers of networks, and when a simple image is segmented, fewer feature extraction module may be adaptively used for feature extraction, which may save computational complexity and speed up network computing.

In still another alternative implementation, Step S410 may comprise: Step 6, wherein, Step 6 (not shown in Figure): inputting a feature map obtained based on a current feature extraction module and a category prediction result obtained based on a current feature extraction module, to a next feature extraction module for feature extraction. The above category prediction result may be a category ID of each pixel, i.e., a pixel category label, or a category probability feature map obtained by performing feature map processing based on the feature map extracted by the current feature extraction module.

Alternatively, Step 6 may comprise: the feature map obtained based on a current feature extraction module and the category prediction result obtained based on a current feature extraction module are fused and input to a next feature extraction module for feature extraction.

For example, in case of prioritizing calculation speed, a fusion unit may not be passed through, and in case of prioritizing performance, for better interaction and fusion of information, a fusion unit may be passed through, and then fused result is transmitted to subsequent deep feature extraction module.

For convenience of description below, this extraction feature scheme is simply referred to as a multi-channel prediction mode.

This extraction feature scheme using multi-channel prediction may overcome the following problems compared with extracting features using a fixed network structure:

In feature extraction networks of the prior art, the features output by a shallow feature extraction module and prediction results of a shallow module passing through feature map processing, such as a category probability feature map, are used as an input of the latter feature extraction module. This has caused fragmentation and loss of relationship information among objects to a certain extent, and semantic information has not been fully utilized.

In the multi-channel prediction mode provided by the present disclosure, prediction result inferred by a shallow 1 module is used as another input of the deep network, and the preliminary result of the shallow layer network comprises semantic information between objects, for example people riding bicycles, by which a deep network may be guided to extract more spatial and more semantic information thereby reducing the prediction region. In the embodiment of the present disclosure, the usage of prediction result of the shallow extraction module based on the multi-channel prediction mode to guide a deep extraction module improves accuracy of the feature extracted by the feature extraction network and improves accuracy of semantic segmentation.

In addition, since increase of input information of the feature extraction module and reduction of required prediction region, the present disclosure provides that the number of channels of a convolution layer of a deep layer network in the feature extraction network may be correspondingly reduced without losing the segmentation accuracy, that is, the number of channels of a convolution layer of a deep feature extraction module may be correspondingly reduced, for example, it is set that the number of channels of the convolution layer in the feature extraction module in the feature extraction network is smaller than the predefined channel number threshold, wherein it is set that the feature extraction module may be at least one feature extraction module whose depth is greater than the third depth threshold. This network design may save computational complexity of semantic segmentation and speed up network computing.

Figure 7:
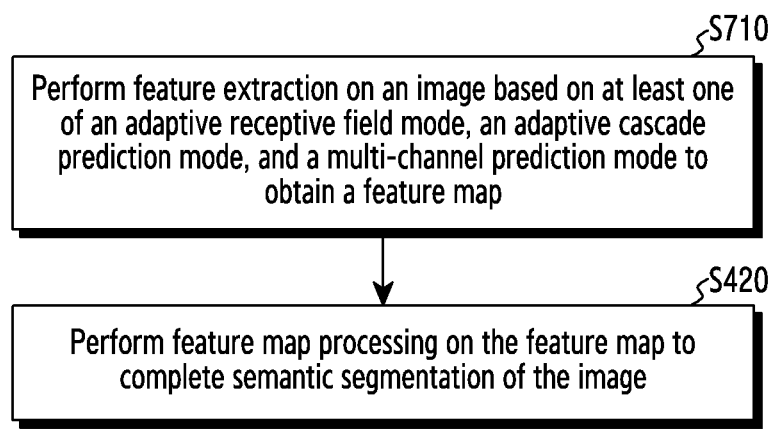
FIG. 7 is a schematic flowchart of still another method for image segmentation provided by an embodiment of the present disclosure.

In combination with the above schemes for feature extraction, as shown in FIG. 7, Step S410 comprises step S710. Wherein, the step S420 in FIG. 7 may be the same as the step S420 in FIG. 4, and may be the same as the step S620 in FIG. 6, for which the specific implementation thereof may be referred to the introduction of step S420 or step S620, and details are not described herein again. In particular, Step S710: performing feature extraction on an image based on at least one of an adaptive receptive field mode, an adaptive cascade prediction mode, and a multi-channel prediction mode to obtain a feature map.

Further, the method for image segmentation provided by the embodiment of the present disclosure further comprises the step of: when performing offline training on each mode used in a semantic segmentation process, the loss function Dloss used is:

$$L(x, c) = \frac{1}{N}(L_{conf}(x, c))$$

$$L_{conf}(x, c) = -\sum_{i \in Pos}^{N} x_{ij}^p \log(\hat{c}_i^p) - \sum_{i \in Neg} \log(\hat{c}_i^0) \text{ where}$$

$$\hat{c}_i^p = \frac{\exp(c_i^p)}{\sum_p \exp(c_i^p)}$$

wherein, N is the total number of pixels in the image, i is the predicted category, j is the actual category, $c_i$ is the probability that a pixel belongs to the category i, p is the category whose prediction is consistent with the reality, $x_{ij}^p = \{1, 0\}$, indicating whether prediction category is consistent with the reality.

Then, in offline training, the total target loss function is:

Loss=Segloss+α*Dloss wherein, Segloss is the standard cross-entropy loss function, and α is the balance weight of Dloss and Segloss.

The above loss function is used to solve the problem of uneven distribution of training samples, compared with the existing method using pixel-level difficult sample mining method, may overcome the following problems:

by using pixel-level difficult sample mining to solve unevenness of the training samples, in the network training process, it is necessary to perform some special processing on pixels of a small number of samples in the training sample image or containing samples that are difficult to segment, for example, increasing error weight of these pixels in the loss function, or increasing the number of images in the data set. Such processing simply judges pixels to be processed for categories, ignores positional relationship among object pixels and object characteristics, and thus performance improvement is limited.

Aiming at the problems of uneven distribution of training samples mentioned above, the present disclosure provides a method for object-level difficult sample mining, which uses information among objects to enhance segmentation effect of objects of fewer categories. Specifically, provides a new loss function Dloss for improving the traditional cross-entropy loss function, which may increase the weight of difficult-to-predict categories, so that the training process pays more attention to samples containing a small number of categories or category that are more difficult to segment, thereby effectively improving overall semantic segmentation accuracy.

It may be seen that the method for image segmentation provided by the embodiment of the present disclosure, may effectively improve performance of semantic segmentation.

The technical solutions of the present disclosure and the difficulties solved by the technical solutions of the present disclosure will be described in detail below with reference to specific embodiments. The following specific embodiments may be combined with each other, and the same or similar concepts or processes may not be described in some embodiments.

Embodiment 1

The solution provided by the embodiment of the present invention introduces the technical solution shown in FIG. 6 in detail, and may solve the above difficulty 1, specifically:

in most network structures, in order to obtain more characteristic feature information, a feature map needs to be further processed, and feature map processing often refers to convolution processing on the feature map.

The standard convolution mode uses information of fixed region of the current layer only, such that convolution may not effectively cover a larger region. For an object of a specific shape, for example a high or wide object, if a convolution kernel may not cover the entire object, the segmented object may be discontinuous.

Figure 8:
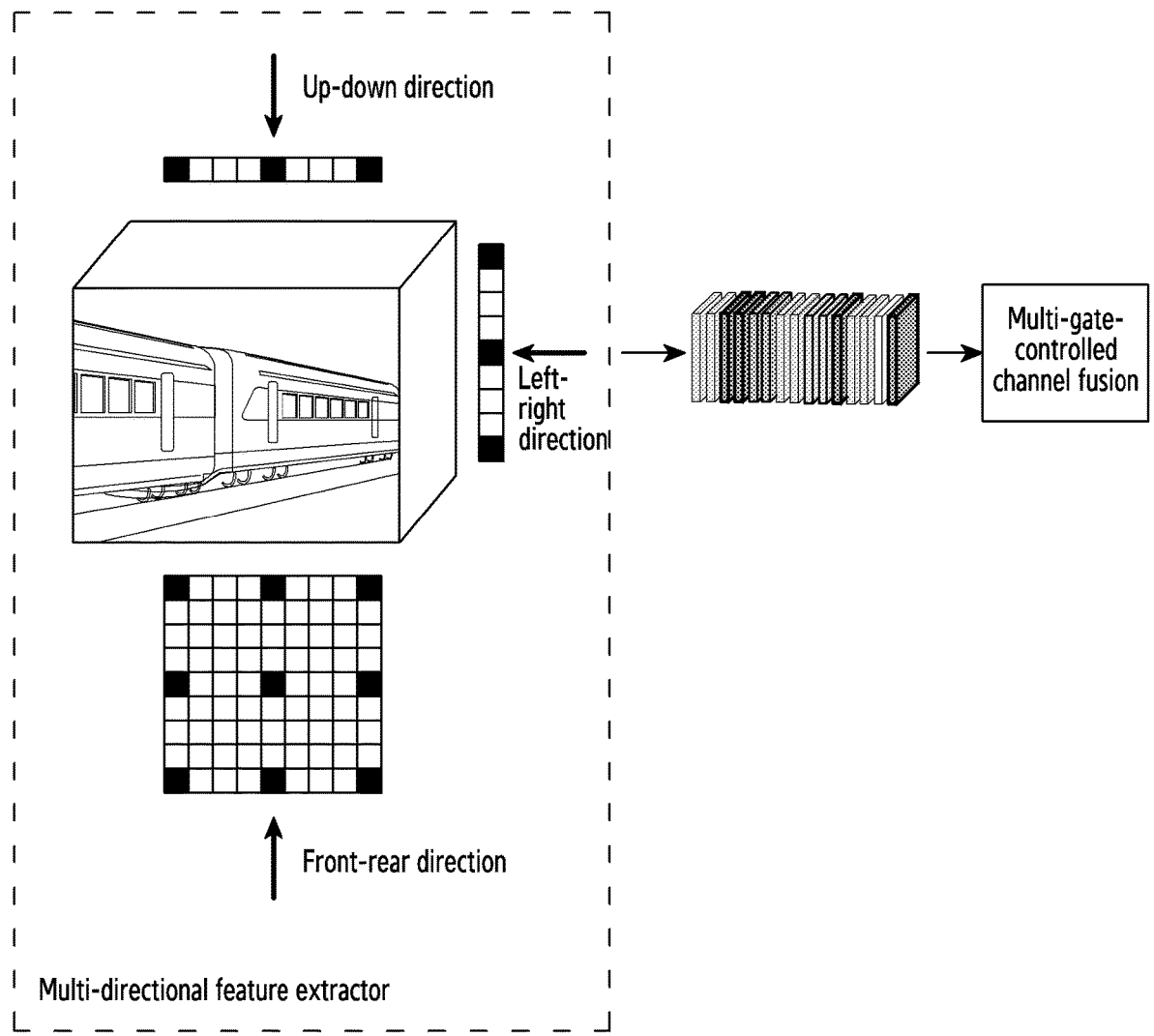
FIG. 8 is schematic diagram one of a method for multi-directional feature map processing provided by an embodiment of the present disclosure.

The inventors of the present disclosure have found that one feature map may be regarded as a three-dimensional matrix as shown in FIG. 8. Based on this, the embodiment of the present disclosure provides a method for multi-directional feature map processing, which may perform convolution operation for different directions of the feature map, such that higher-level feature information may be obtained from different directions. The multi-directional convolution mode may obtain information of multiple rows or columns in the feature map, that is to say, when the convolution operation is performed in up-down direction or left-right direction, each convolution operation may cover a larger region from the front view.

For example, for the high and thin street lamp in Difficulty 1, the ordinary convolution operation is to dividing the object into blocks and the perform the convolution operation, resulting in independence between the blocks which is easy to appear that prediction is correct in the upper and lower parts of the street lamp but error in middle. However, for multi-directional convolution, convolution in up-down direction may assist in covering an entire object from the forward direction, and this convolution mode may improve accuracy and stability when segmenting an object of a specific shape (for example, a relatively large object in a certain direction of the image).

Figure 9:
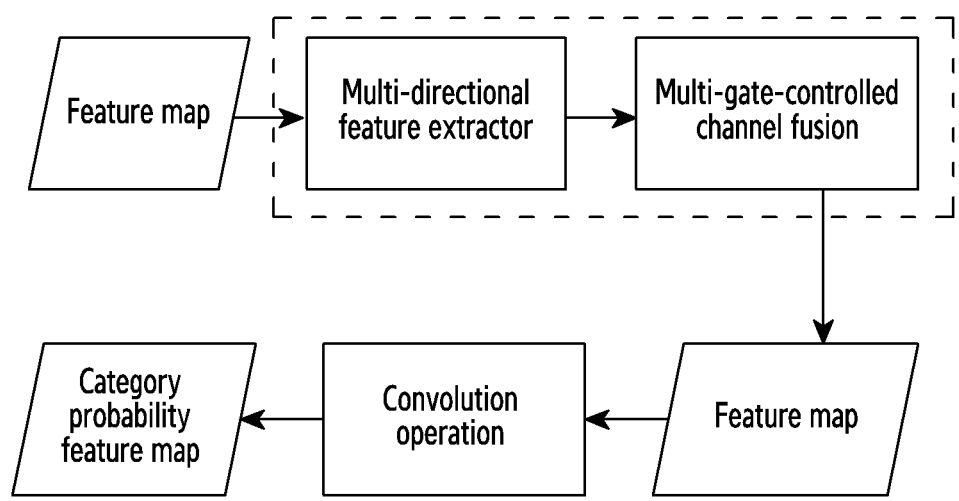
FIG. 9 is schematic diagram two of a method for multi-directional feature map processing provided by an embodiment of the present disclosure.

As shown in FIG. 9, the virtual block part may be used as processes of feature map processing. In a feasible implementation, the virtual block part may be executed by a predefined multi-directional feature map processor.

Wherein, the multi-directional feature map processor may comprise a multi-directional feature extractor and a multi-gate-controlled channel fusion. In combination with FIG. 6 and FIG. 8, Step S6201 is performed by the multi-directional feature extractor, and Step S6202 is performed by the multi-gate-controlled channel fusion method.

In practical application, as shown in FIG. 9, the process of the feature map processing may further comprise performing convolution operation on the fusion-processed feature map after performing Step S6202 through the multi-gate-controlled channel fusion method to obtain a category probability feature map.

As an example, a complete semantic segmentation flow may comprise: performing feature extraction on the input processed image through a feature extraction network to obtain a feature map; inputting the obtained feature map into a multi-directional feature extractor, and the multi-directional feature extractor performing convolution operation for at least two directions of the feature map (for example, at least two of front-rear direction, left-right direction, and up-down direction) respectively, and then performing fusion processing on the convolved result, wherein, during performing fusion processing, the multi-gate controlled channel fusion method proposed in the embodiment of the present disclosure may be used to obtain the fused feature map, then the convolution operation and softmax are used to obtain the category probability feature map, and the category ID may be determined according to the object category probability feature map, i.e., the category ID of maximum probability corresponding to each pixel may be determined.

In the above semantic segmentation flow, the pooling operation is an alternative operation. That is, when the convolution operation is performed for at least two directions of the feature map, the pooling processing may be performed on the feature map at the same time. If performed the pooling processing, the result obtained after the convolution is fused with the result obtained after the pooling to obtain a fused result, and an object category probability feature map is obtained according to the fused result to determine the category ID.

In fact, for the embodiment of the present disclosure, the feature map processing for each direction of the feature map refers to the above step S6201. Specifically, only the convolution operation may be used; or only the pooling operation may be used; or the convolution operation and the pooling operation may be used simultaneously; or the convolution operation may also be performed for each direction, and then the pooling operation may be used according to the convolution results. For different operation modes, the specific fusion processing process may refer to the introduction of Step S6202 mentioned above, and details are not described herein again.

Specifically, in Step S6201, the convolution modes and the convolution parameters corresponding to different directions may be same, for example, the same convolution mode and the same convolution parameter, are used respectively to perform convolution operation for the at least two directions of the feature map to obtain the convolution result. Alternatively, the convolution modes and the convolution parameters corresponding to different directions may be different. For each direction, the convolution operation is performed for the corresponding direction of the feature map by using the convolution mode and the convolution parameter corresponding to the direction to obtain a convolution result.

Wherein, convolution modes comprise standard convolution, atrous convolution, depthwise convolution or separable convolution. Convolution parameters comprise a convolution kernel size, a dilation rate, a convolution step size, a parameter amount (determined by kernel size, dilation rate, etc.), etc. When the convolution mode is atrous convolution, the convolution kernel has a corresponding dilation rate. When the convolution mode is non-atrous convolution, the convolution parameters comprises the convolution kernel size, the step size and the parameter amount which is determined by the kernel size.

Similarly, in Step S6201, the pooling modes and the pooling parameters corresponding to different directions may be same, for example, the same pooling mode and the same pooling parameter, are used respectively to perform pooling operation for the at least two directions of the feature map to obtain the pooling result. Alternatively, the pooling modes and the pooling parameters corresponding to different directions may be different, then for each direction, the pooling operation is performed for the corresponding direction of the feature map by using the pooling mode and the pooling parameter corresponding to the direction to obtain a pooling result.

Wherein, pooling modes comprise maximum pooling, average pooling, etc. Pooling parameters comprise a pooling kernel size, a pooling step size, etc.

In the embodiment of the present disclosure, at least two directions of the feature map provided in Step S620 comprise at least two directions of front-rear direction, left-right direction, and up-down direction.

In practical applications, the forward direction of the feature map, that is, the front-rear direction may still be used as the main direction of feature map processing, and other directions may be used for auxiliary processing. This is because the performance of the convolution operation is higher in the front-rear direction compared with the other directions. Therefore, the front-rear direction may be selected, and at least one direction is selected from left-right direction and the up-down direction for convolution.

Wherein, for each direction of the feature map, one convolution kernel may be set, or multiple convolution kernels with the same convolution mode and different convolution parameters may be set. That is to say, for each direction of the feature map, the convolution kernel of the convolution operation may be one or more, and when there is a plurality of convolution kernels, the convolution modes of the convolution kernels are the same, and/or the convolution parameters are different.

In the embodiment of the present disclosure, the convolution mode and the convolution parameter corresponding to each direction may be predefined. If convolution modes or convolution parameters corresponding to different directions are different, a convolution mode and a corresponding convolution parameter of each direction may be set respectively.

In combination with the manner of determining the convolution mode and the convolution parameter corresponding to each direction in the above Step S6201, as an example, the convolution mode in front-rear direction may be set as atrous convolution, and the number of convolution kernels and parameters corresponding to each convolution kernel may be set by empirical or experimental results. Then convolution modes and convolution parameters in up-down direction and left-right direction may be set according to the convolution mode and convolution parameters in front-rear direction. For example, the convolution mode in up-down direction or left-right direction may be set as depthwise convolution, or the convolution mode in up-down direction or left-right direction may also be set as atrous convolution, and the number of convolution kernels is set as same as the number of the convolution kernel in front-rear direction. If the kernel size of the convolution kernel in front-rear direction is large, the kernel size of the convolution kernel in up-down direction or left-right direction may also be set large.

Alternatively, in combination with the convolution mode and convolution parameters corresponding to each direction determined in Step S6201, the convolution mode and the convolution parameter corresponding to each direction may be set in real time, for example, selecting the corresponding convolution mode and convolution parameter for each direction according to a device status and a task requirement.

If the task demands high real-time requirements, or the equipment is low in power or the equipment is busy, it is set that convolution modes and/or convolution parameters in up-down direction/left-right direction is different from these in front-rear direction, for example, the atrous convolution is used in front-rear direction, and the depthwise convolution is used in up-down direction/left-right direction, and smaller and fewer convolution kernels may be used in up-down direction/left-right direction.

If the task demands high performance, or the device has enough power or the device is in idle, convolution modes and/or convolution parameters in up-down direction/left-right direction may be set as same as these in front-rear direction.

Similarly, for each direction of the feature map, one pooling kernel may be set, or multiple pooling kernels with the same pooling mode and different pooling parameters may be set.

In this solution, the pooling mode and the pooling parameter corresponding to each direction may be predefined. If pooling modes or pooling parameters corresponding to different directions are different, a pooling mode and a corresponding pooling parameter for each direction may be set respectively.

In combination with the manner of determining the pooling mode and the pooling parameter corresponding to each direction in the above Step S6201, as an example, the pooling mode in front-rear direction may be set as average pooling mode, and the pooling kernel size may be set equal to the length and width of the feature map by empirical or experimental results. Then pooling modes and pooling parameters in up-down direction or left-right directions may be set according to the pooling mode and pooling parameters in front-rear direction, for example, the pooling mode in up-down direction or left-right direction may be set to the maximum pooling or averaging pooling, and the pooling kernel has a width of 1 in left-right direction and a height of 1 in up-down direction.

It may be seen from the above introduction that after further convolution processing and/or pooling processing on the feature map, it is necessary to perform fusion processing on the obtained feature map.

When the prior art performs feature fusion, most of them are directly performed by the concat or add operation, resulting in poor fusion effect. Different features contribute differently to the final result output, and direct fusion may cause important features to be masked and affect system performance.

The embodiment of the present disclosure provides a method for multi-gate-controlled channel fusion for fusing a feature map after multi-directional feature extraction, in combination with Step S6202 provided above, in simple terms, the method may be implemented in the following manner: performing fusion processing on the operation result for at least two directions by at least one control gate. Wherein, each control gate is defined as follows:

Gate 1: the gate performs an operation on the obtained feature offset information, this offset may enhance the effective information of the current channel while suppressing invalid information of the current channel. Prior to this, by applying a predefined convolution operation on the feature map (the operation result above) output by the multi-directional feature extractor, a channel correlation feature for describing the relationship between different channels is obtained. Gate 1 uses a predefined activation function on the channel correlation feature to obtain the corresponding offset information, wherein the activation function may be relu, leaky relu, relu 6, selu, tanh, sigmoid, etc. Specifically, the control method of Gate 1 comprises: adding the obtained offset information and the operation result (that is, performing offset processing on the operation result); or, adding the obtained offset information and the output result of the other control gates (that is, performing offset processing on the output result of other control gates).

Gate 2: the gate performs operation on the obtained fusion weight information. Prior to this, by applying a predefined convolution operation on the feature map (the operation result above) output by the multi-directional feature extractor, a channel correlation feature for describing the relationship between different channels is obtained. Gate 2 uses a predefined activation function on the channel correlation feature to obtain the weight of each feature in the feature map output by the multi-directional feature extractor, wherein the activation function may be relu, leaky relu, relu 6, selu, tanh, sigmoid, etc. Specifically, the control method of Gate 2 comprises: adding the obtained weight information and the operation result (that is, weighting the operation result); or, multiplying the obtained weight information and the output result of the other control gates (that is, weighting the output of other control gates).

Gate 3: the gate is a pass-through gate, only performing skip connection processing (which may be called a skip operation), and has the same input and output, which are both feature maps output by the multi-directional feature extractor. The role of the gate is to maintain detailed information of the category ID map final output by semantic segmentation. Specifically, the control method of Gate 3 comprises: adding the output results of the other control gates and the operation result by a skip operation.

In practical application, different gate controls may be selected according to specific needs, for example, to keep the edge of the category ID map clearer, Gate 2 and Gate 3 may be used, and if only for suppressing the wrong region in the category ID map, Gate 1 and Gate 2 may be used, or Gate 1 and Gate 3 may be used. In combination with Step S6202, Gate 1 and Gate 2 may also be used separately. In addition, in the embodiment of the present disclosure, the order of the three types of gates is not limited, for example, Gate 3 may also be set after Gate 1 and Gate 2, and Gate 3 may also be set between Gate 1 and Gate 2. The embodiment of the present disclosure does not limit the order of the three types of gates, for example, two of Gate 1 may be used at the same time. In practical applications, the desired control gate may be selected by opening and closing the corresponding control gate.

Figure 10:
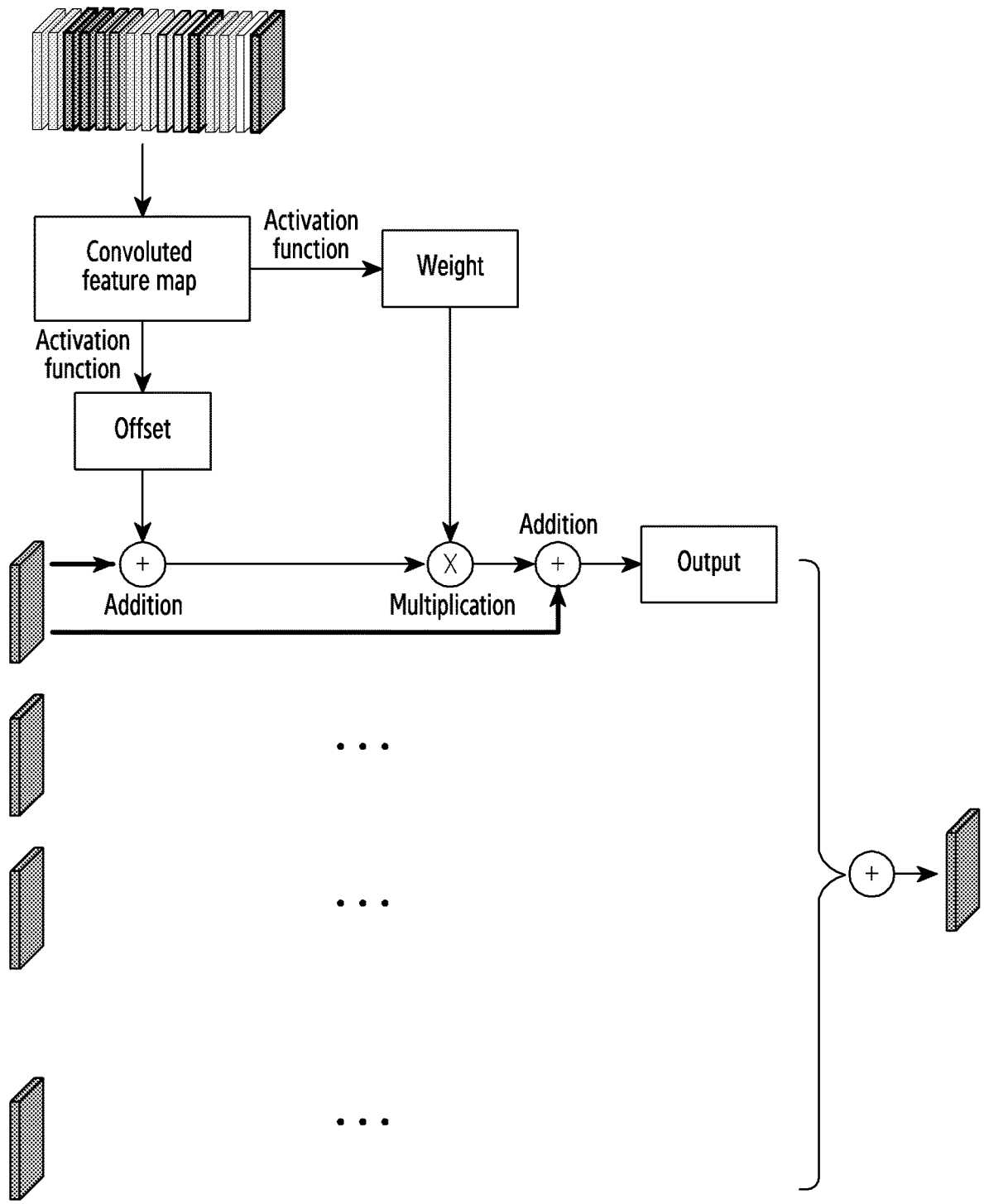
FIG. 10 is a logic schematic diagram of a multi-gate-controlled channel fusion provided by an embodiment of the present disclosure.

As shown in FIG. 10, the embodiment of the present disclosure provides a logic flow of a feasible method for multi-gate controlled channel fusion processing provided by an embodiment of the present disclosure, in which, for simply expressing, one output result (an result of one convolution operation or an result of one pooling operation) of all the outputs of the multi-directional feature extractor is taken as an example: the feature map of the result is first added to the offset of Gate 1, then multiplied by the weight of Gate 2, and then added to the feature map of the result in Gate 3, to obtain the result of the feature map of the result after the first fusion process. Then the above processes are repeated, the first fusion processing step is applied to each output result of the multi-directional feature extractor, and finally feature maps corresponding to results of all the first fusion are summed to obtain the final fused result.

It should be noted that the method for feature map processing in the embodiment of the present disclosure may be combined with any other manner for feature extraction (for example, the existing feature extraction manner, the feature extraction manner provided in the subsequent embodiments, etc.).

The following takes the Atrous Spatial Pyramid Pooling (ASPP) as an example to introduce the implementation process of the method for multi-directional feature map processing based on the embodiment of the present disclosure:

The standard ASPP uses four parallel convolution kernels with different dilation rates for atrous convolution operation on the front side of the feature map. The term of "parallel" means that convolution operation is performed on the same feature map by using four different convolution kernels. During performing atrous convolution, if the dilation rate is different, the convolution kernel may be considered different.

Figure 11:
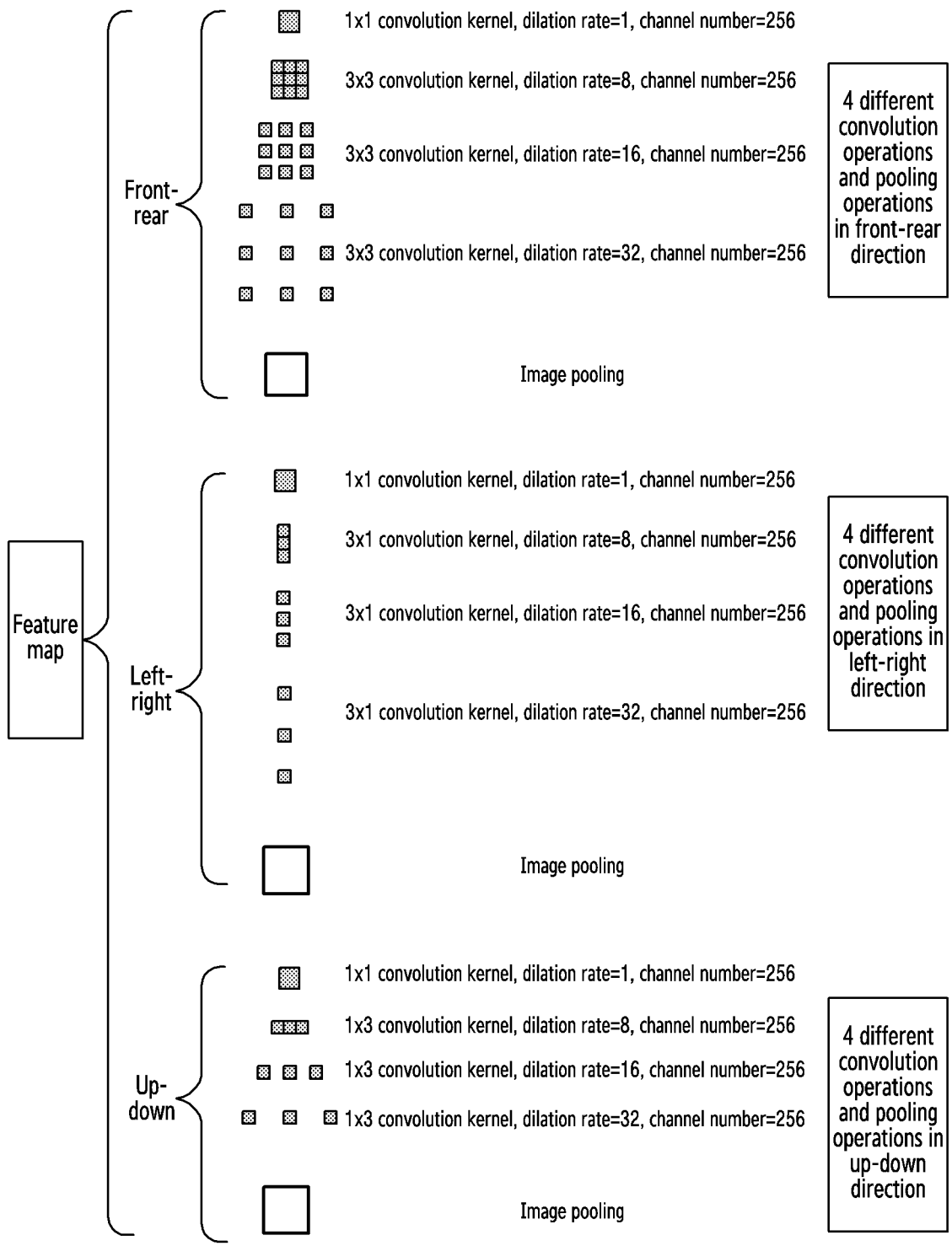
FIG. 11 is a schematic diagram of a multi-directional convolution using ASPP as an example provided by an embodiment of the present disclosure.

In the embodiment of the present disclosure, for the execution process of the multi-directional feature extractor, convolution operation is performed respectively for different directions of the feature image, and then, as shown in FIG. 11, the part similar to ASPP is that: in front side (front-rear direction) of the feature map, one or more atrous convolution operation with different dilation rates may be used, and the embodiment of the present disclosure takes four as an example. In addition to convolution operation, pooling operation may also be performed on the feature map. The pooling mode may be the average pooling, and the pooling kernel size is as same as the feature map size.

the part different from ASPP is that: in addition to convolution operation and pooling operation in front side, convolution operation and/or pooling operation in up-down direction and/or left-right direction may also be performed. During performing convolution operation and/or pooling operation in up-down direction and/or left-right direction, one dimension of the convolution kernel (and the pooling kernel) may be limited as 1 in order to ensure that there is no influence among the channels and avoid the spatial position disorder, that is, each convolution operation or pooling operation is for a certain layer in the feature map.

As an example, a plurality (e.g., four) of parallel convolution operation are used in left-right direction, the convolution kernel sizes of these convolutions are all 1 in width, and the heights may be different S, such as S=3, and each convolution kernel size may be set to be consistent, i.e., [3, 1], or to be inconsistent. The dilation rate corresponding to each convolution kernel (for simple description, the following is expressed as rate) may be consistent or inconsistent, for example, the rate of each convolution is {1, 8, 16, 32} respectively.

Alternatively, the pooling operation is also used in left-right direction, taking the average pooling as an example. The average pooling step size is 1, and the kernel size is [H, 1] (H is the height of the feature map). After the average pooling operation, the feature map may be scaled back to its original size.

The same strategy in up-down direction may be used as in left-right direction. The difference is that the size of the convolution kernel is [1, 3], and the kernel size of the average pooling is [1, W] (W is the width of the feature map).

Furthermore, in standard ASPP, multi branch features are directly concatenated (also known as concat operation, used to connect two or more arrays). Concat operation may not effectively highlight effective information, but will flood effective information, so the concat mode may affect the performance after the fusion.

In the embodiment of the present disclosure, the method for multi-gate-controlled channel fusion may combine results after different convolutions or pooling through learning:

If convolution and pooling are processed in parallel, all convolution results and pooling results in all directions are first connected to obtain a combined feature map; if convolution and pooling are processed serially, all pooling results in all directions are first connected to obtain a combined feature map.

In the embodiment of the present disclosure, the multi-gate-controlled channel fusion may be considered as obtaining a fusion weight corresponding to each layer for each layer of the combined feature map, and performing weighting processing on each layer according to the fusion weight of each layer, for example, weighed summation processing.

Specifically, an "union" operation is first applied to all feature maps output by the multi-directional feature extractor.

After completing the union operation, it is necessary to learn contribution of each feature map to the final output result, for which the method for multi-gate-controlled channel fusion is adapted to learn contribution of different feature maps to final output results.

When learning contribution of a feature maps to the final output result, a 1×1 convolution operation is firstly performed on a feature map after the union operation on all feature map output by the multi-directional feature extractor, to obtain channel correlation features, and then the following three-gate control is passed through.

Firstly, Gate 1 is passed through, this gate is a tanh operation, and this gate is used to enhance information and suppress useless information, the input of this gate is a channel correlation feature and the output is offset. The reason that the tanh is used to enhance information here is that the data interval of tanh is [−1, 1], this method may suppress some unnecessary data on the feature map, and also enhance the range of partial data.

Then, Gate 2 is passed through, this gate is a sigmoid operation, the input of this gate is a channel correlation feature, and the output is the weight obtained by learning. The reason that the sigmoid is used here is that the data interval of sigmoid is [0, 1], a weight may be obtained directly.

Then, Gate 3 is passed through, and this gate directly performs skip operation to maintain detailed information without losing.

In summary, the output of Gate 3, is that a product of weight and a sum of a result output by the multi-directional feature extractor and offset, adds the result. Each operation in each direction uses the same way to obtain the output. Finally, all outputs are summed together to obtain the final output.

Therefore, one of the advantages of the method for multi-directional feature map processing provided by the embodiment of the present disclosure is that: compared with the concat operation, the multi-gate-controlled feature fusion may be learned; compared with the single-gate control, the multi-gate control may enhance effective information, and maintain detailed information of output category ID map.

Experiments carried out by the inventors of the present disclosure revealed that:

1. the multi-directional feature extractor based on the embodiment of the present disclosure has a performance improvement of 0.8% on the verification set compared with the standard ASPP;

2. the method for multi-gate-controlled channel fusion based on the embodiment of the present disclosure has a performance improvement of 0.2% on the verification set compared with the concat operation;

The results show that the multi-directional feature processor of the embodiment of the present disclosure may improve segmentation effect on an object of a specific shape.

Embodiment 2

According to the solution provided by the embodiment of the present disclosure, the technical solution for feature extraction on an input image by using adaptive receptive field is described in detail, which may solve above Difficulty 2, specifically:

in semantic segmentation, there are abundant sizes of objects in an input image. In a network, a receptive field of a certain convolution layer means that the range affected by the convolution operation in the layer corresponds to the size in the input image, and the receptive field are mainly determined by convolution parameters (for example, a convolution kernel size or dilation rate, etc.). A large receptive field may better cover a large-sized object and accurately extract features of such object, but for a small-sized objects, excessive noise information is introduced to reduce the accuracy of feature extraction; on the contrary, a small receptive field may better cover a small-sized object and accurately extract features of such object, but for a large-sized object, such object may not be completely covered, resulting in incomplete feature extraction and decline of extraction performance.

Therefore, the inventors of the present disclosure believe that in order to perform semantic segmentation of objects having different size and shapes, it is necessary to flexibly adjust receptive field so that it may just cover the corresponding object size.

However, in the prior art, after network training, convolution parameters of all layers in the network are fixed, that is, receptive field of the network structure is fixed, and may not be adjusted in application phase. In order to be able to adapt to a variety of object sizes, the existing methods mostly employ large-scale training sets containing objects of various sizes. It is not difficult to understand that such methods are very computationally intensive, costs expensively to acquire the training set, and are difficult to cover all situations.

Figure 12:
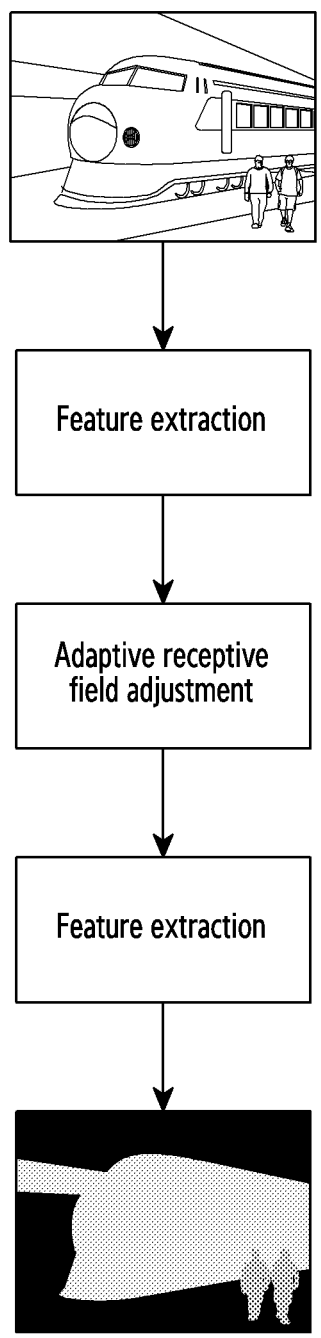
FIG. 12 is a schematic diagram of feature extraction based on adaptive receptive field provided by an embodiment of the present disclosure.

In order to solve the above problem, the embodiment of the present disclosure provides an adaptive receptive field, which may adaptively adjust receptive field of network online according to the size of the object in an input image, to bring better feature extraction capability. As shown in FIG. 12, an input image is performed feature extraction for several times; after a feature extraction, adaptive receptive field adjustment is performed and then the feature extraction is continued; feature map processing is performed to obtain the segmentation result according to the final extracted feature map, finally improving segmentation performance. Intuitively, it is possible to extract features of large-sized objects with large receptive fields, and extract features of small-sized objects with small receptive fields.

Figure 13:
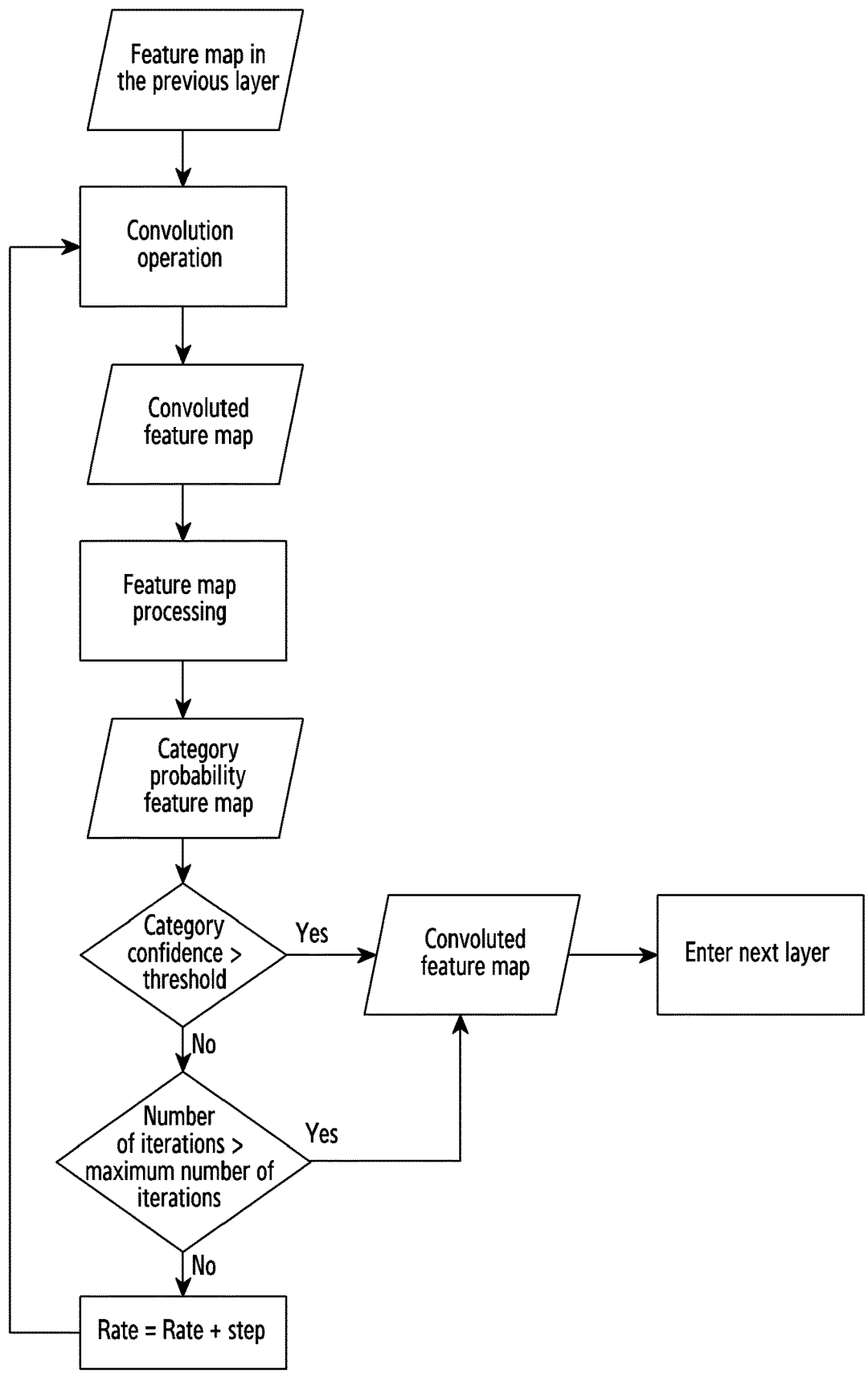
FIG. 13 is a schematic flowchart of an adaptive receptive field provided by an embodiment of the present disclosure.

In particular, the processes of performing feature extraction on an input image to obtain a feature map by adaptive receptive field may be referred to above Step 1, Step 2, and Step 3, and if adaptive receptive field is performed in a set convolution layer, for the feature map obtained by feature extracting module, the method is shown in FIG. 13 in simple terms:

Step SA: inputting a feature map in the previous layer, wherein, the feature map in the previous layer may be feature maps output by a convolution layer, or a pooling layer, or a batch normalization layer in the previous layer.

Step SB: performing convolution calculation on the feature map in the previous layer according to the current convolution modes and convolution parameters, to obtain a convoluted feature map. The convolution calculation may be standard convolution, depthwise convolution, separable convolution, or the like.

Step SC: using the result processed by the feature map processing module (which may be unidirectional or multi-directional in embodiment 1) to obtain a category probability feature map. The result processed by the feature map processing module may be performed convolution and softmax to obtain a category probability feature map.

Each feature value in the category probability feature map represents a probability value of a corresponding pixel belonging to a certain object category. According to the category probability feature map, the probability (corresponding to the category confidence above) of each category is determined, which a larger probability means greater accuracy of predicted category ID map, and thus more suitable receptive field. Conversely, a smaller probability means lower accuracy of predicted category ID map, and means that the unsuitable size of current receptive field needs to be further adjusted. Specifically, the highest probabilities are obtained for all the pixels in the object category probability feature map, and the average value of each highest probability is obtained (i.e., the manner of determining the category confidence in Step 2 above). If the average value is greater than the threshold, it means greater accuracy of the predicted category ID map, and more suitable receptive field.

Here, the accuracy may be judged according to a threshold set in advance. If the probability of the object category is greater than the threshold, it is considered that the best receptive field has been found, the feature map obtained by convolution in the receptive field is outputted, and the next layer is entered for processing; if the probability of the object category is less than or equal to the threshold, the SD judgment is entered (i.e., the manner of confirming whether it is necessary to adjust the convolution parameter corresponding to the set convolution layer in above Step 3).

Step SD: determining whether the number of iterations meet the maximum iteration number, because iterative convolution operation calculation consumes a certain amount of computing resources and needs to be controlled, the number of iterations needs to be limited. If computing resources are sufficient, the number of iterations may not be set.

It is assumed that there are n adaptive receptive field modules in the entire network, and the maximum possible number of iterations of each module is m (corresponding to the predefined second iteration number threshold in the above, which may be set by those skilled in the art according to actual situation). The maximum value of the total number of iterations of all adaptive receptive field modules in the network is N (corresponding to the predefined first iteration number threshold in the above, which may be set by those skilled in the art according to actual situation). Then the possible number of iterations per module needs to satisfy the following conditions:

$$\begin{cases} \sum_{i=1}^{n} \text{iteration} < N \\ \text{iteration} < m \end{cases}$$

If this iteration still satisfies the iteration condition, then continues to search for the best receptive field.

Otherwise, although the best receptive field is not found, the current receptive field may only be regarded as a relatively good receptive field that has been found since the computing resource consumption is too large, and the feature map obtained by convolution in the receptive field is output.

In above processes, it is necessary to calculate the parameter variation of the receptive field (that is, the parameter variation corresponding to the set convolution layer). The parameter variant step may be a fixed value, or may be determined by an average probability (i.e., the above-mentioned category confidence) and a threshold together, wherein the average probability is an average value of probabilities of all categories, and the threshold may be determined empirically. The calculation formula is as follows:

$$\text{step} = int\left(\min\left\{\frac{\text{threshold} * 2}{\text{abs}(\text{Probabilitiy} - \text{threshold})}, \text{Height}, \text{Width}\right\}\right)$$

Height is the height of the feature map, and Width is the width of the feature map. The maximum step here is limited to not exceed the image itself, since that if the size of the image itself is exceeded, a great amount of useless convolution calculations is performed during the convolution operation.

If the convolution of the layer is the standard convolution, the parameter variation may be the size of the convolution kernel. If the convolution of the layer is the atrous convolution, the parameter variation may be the dilation rate of the atrous convolution.

Further, the convolution parameter is updated by using the parameter variation, for example, the new convolution parameter=old convolution parameter+step, i.e., Rate=Rate+step in the Figure.

Since the above flow requires additional calculation time to obtain a better category ID map, it may be customized according to the different needs of users. Referring to the manner of determining the set convolution layer in step 1 above, as an example, if the user defines that the efficiency has the priority, the flow may only appear in the last key convolution layer of the feature extraction phase. In the feature extraction process, as the network deepens and the resolution of the feature map is continuously reduced, key convolution layers are sorted from large to small according to the feature map resolution, which a key convolution layer refers to the last convolution layer in the same resolution feature map in the feature extraction phase, and the last key convolution layer is a key convolution layer with lowest resolution. The reason that the last convolution layer in the same feature map resolution is defined as the key convolution layer, is that the convolution operation of the convolution layer obtains the best semantic information of the feature map at the resolution. If the user defines that the performance has the priority, the flow may be applied to at least two key convolution layers. Since the adaptive receptive field module has a limited adjustment range for the receptive field, multiple applications may bring better performance.

Figure 14:
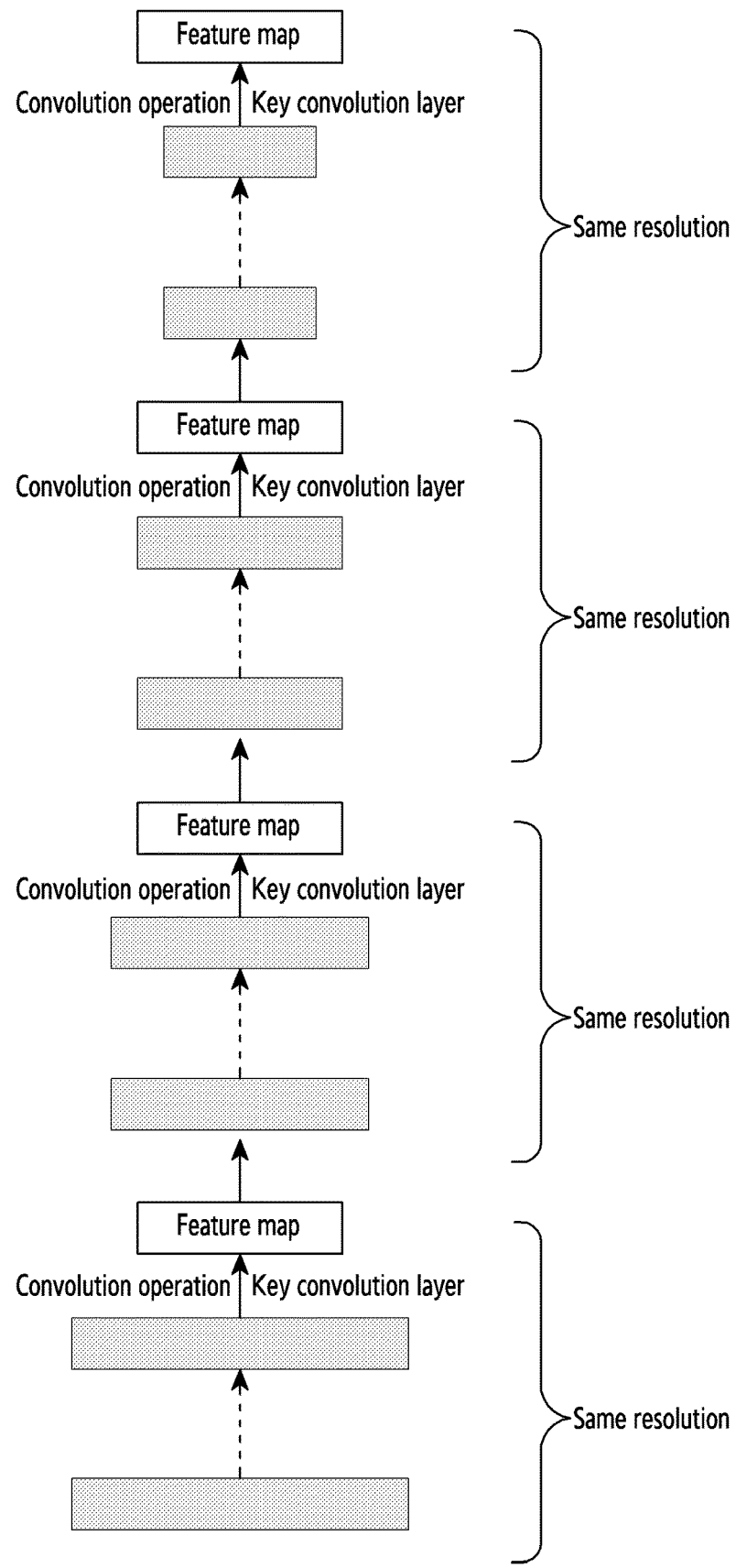
FIG. 14 is a schematic diagram of applying an adaptive receptive field module provided by an embodiment of the present disclosure.

If the algorithm is deployed in cloud environment or an environment with sufficient computing capability and extremely high performance is required, as shown in FIG. 14, an adaptive receptive field operation may be employed in each convolution layer. This may be used to find the best receptive field scheme to obtain the best category ID map. In FIG. 14, the convolution layers in same resolution constitutes a feature extraction module.

The adaptive receptive field provided by the embodiment of the present disclosure comprises at least the following advantages:

1. adaptive receptive field may improve segmentation stability of objects of different sizes.

2. adaptive receptive field may be applied to key parts without consuming too much time.

Thus, experiments carried out by the inventors of the present disclosure revealed that:

if manually setting convolution rate as 2, performance will be increased by 0.2%.

if manually setting convolution rate as 6, performance will be increased by 0.3%.

The adaptive receptive field brings a 0.4% performance increase in verification set.

Figure 15:
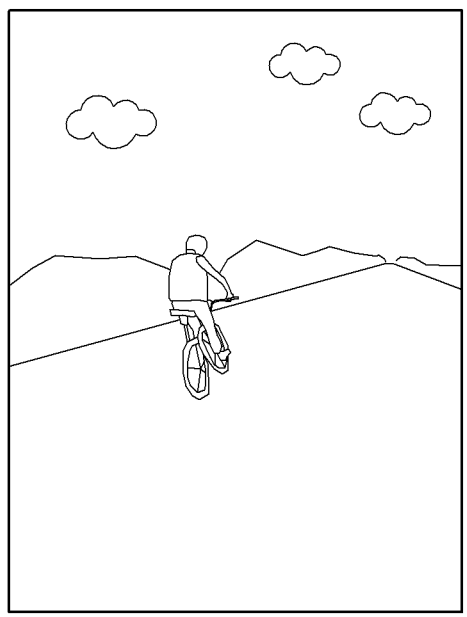
FIG. 15 is schematic diagram one of the experimental results of embodiment 2 provided by the present disclosure.
Figure 15:
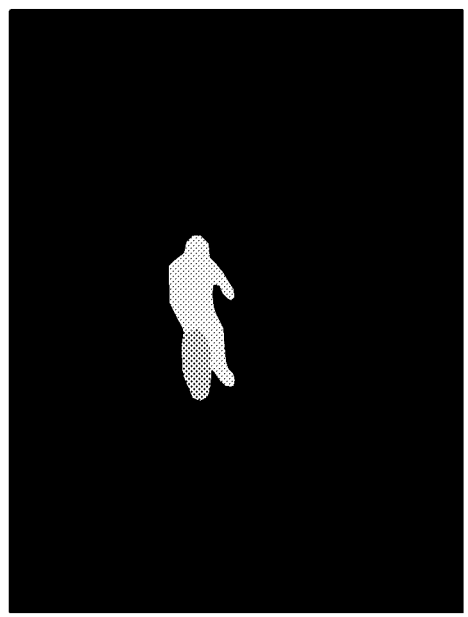
Figure 16:
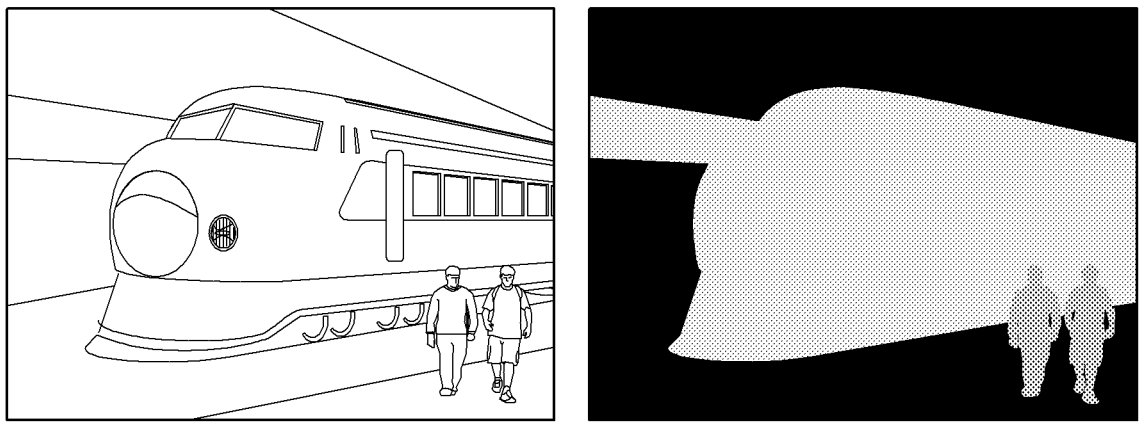
FIG. 16 is schematic diagram two of the experimental results of embodiment 2 provided by the present disclosure.

As shown in FIGS. 15-16, the adaptive receptive field is more robust to objects of different sizes.

In addition to the above-described adaptive receptive field method, the present invention also provides a technical solution for setting the receptive field which is different from the prior art, which will be described in detail below.

At present, a majority of networks set up one multi-receptive field processing module after the feature extraction network, and the multi-receptive field processing module performs a convolution operation on the feature map output by the feature extraction network according to a plurality of preset convolution parameters (for example, the convolution kernel size of each convolution operation is 3*3, but the corresponding rate is different), a plurality of convolved feature maps are obtained, and then the fusion processing (for example, an "AND" operation) is performed on the plurality of convolved feature maps. Subsequent operations (e.g. feature map processing and determination of category probability feature maps, etc.) are performed according to the feature map obtained by the fusion processing.

Wherein, the following way may be used to perform the fusion processing:

$$y=f(f(x))*w1+g(g(x))*w2$$

wherein, y denotes the feature map output by the receptive field processing module, x denotes a feature map input to the receptive field processing module, f(f(x)) denotes a feature map obtained by the convolution processing in one branch, w1 denotes a weight corresponding to this branch, g(g(x)) denotes the feature map obtained by the convolution processing in another branch, w2 denotes a weight corresponding to another branch. Wherein, the convolution processing is performed twice in each branch. For example, f(x) and g(x) are the feature maps obtained by the convolution processing once, and f(f(x)) and g(g(x)) are the feature maps obtained by the convolution processing twice. Wherein, g(x) may be an Atrous convolution, and f(x) may be a standard convolution.

The inventor of the present disclosure finds that, when the feature extraction is performed according to the existing receptive field configuration, the accuracy of the feature extraction is low.

Regarding this, the embodiment of the present disclosure proposes the following processing method of multi-receptive of multi-branch.

Specifically, the processing method of multi-receptive of multi-branch is that: receptive field processing is performed on the feature map extracted by the set feature extraction module by at least one receptive field processing module to obtain a receptive-field-processed feature map.

A general feature extraction network will contain several feature extraction modules, each of which consists of several network layers (such as a convolution layer, a pooling layer, a batch normalization layer, etc.). The embodiment of the present disclosure proposes that one receptive field processing module is preset for the set feature extraction module of the feature extraction network.

Wherein, the set feature extraction module comprising any one of the following:

any one feature extraction module in the feature extraction network; and any one feature extraction module, whose depth is greater than a third deep threshold, in the feature extraction network.

In other words, in the embodiment of the present disclosure, the receptive field processing module may be respectively set for each feature extraction module in the feature extraction network, or the feature extraction module with the depth greater than a set threshold may be selected in the feature extraction network to set the receptive field processing module. In other words, the feature extraction module close to the output end of the network is selected to set the receptive field processing module, for example, the last feature extraction module in the feature extraction network is selected as the set feature extraction module.

Wherein, at least one receptive field processing module may be set for the set feature extraction module, for example, setting one or more receptive field processing modules. If setting multiple receptive field processing modules, the multiple receptive field processing modules may be operated in series, and the feature map output by a previous receptive field processing module is acted as an input of the next receptive field processing module.

The receptive field processing module includes at least one receptive field processing branch.

If one receptive field processing branch is contained, performing the receptive processing by any one receptive field processing module, includes:

performing convolution processing on the feature map output by the set feature extraction module or by a previous receptive field processing module, by a current receptive field processing module, to obtain a convolved feature map.

In a feasible implementation, the receptive field is acquired in multi-branch way while performing the feature extraction. Specifically, the receptive field processing module contains multiple receptive field processing branches, and may contains at least two branches, each of which may have different receptive fields, that is, each of which corresponds to different convolution parameters. After passing through the receptive field of the multi-branch, multiple convolved feature maps may be obtained. After each branch obtains a corresponding fusion weight by the network learning in advance and obtains the multiple convolved feature maps, each branch performs fusion processing on the feature maps obtained by each branch based on a fusion weight corresponding each branch. That is, in the embodiment of the present disclosure, any one receptive field processing module performs receptive field processing, includes: performing convolution processing on the feature map output by the set feature extraction module or by a previous receptive field processing module, by each receptive field processing branch of the current receptive field processing module respectively, to obtain each convolved feature map; and performing fusion processing on each convolved feature map, based on a weight corresponding to each receptive field processing branch of the current receptive field processing module. If the current receptive field processing module is the last receptive field processing module which is not acted as the last feature extraction module, the fusion-processed feature maps may be output to a next feature extraction module for feature extraction. If the current receptive field processing module is not the last receptive field processing module in the multiple receptive field processing modules connected in serial of the set feature extraction module, the fusion-processed feature map may also be output to the next receptive field processing module. If the current receptive field processing module is the last receptive field processing module of the last feature extraction module, subsequent operations (e.g. the feature map processing and the determination of the category probability feature map) may be directly performed on the fusion-processed feature map according to the fusion-processed feature map.

Based on the above solution, the embodiment of the present disclosure proposes two specific implementations, which are specifically introduced below.

The first implementation: the parameter amount in the convolution parameters corresponding to each branch in the receptive field processing module is different, wherein the convolution kernel size may be the same (for example, all the convolution kernel sizes being 3*3), and the rate may be different.

Figure 32:
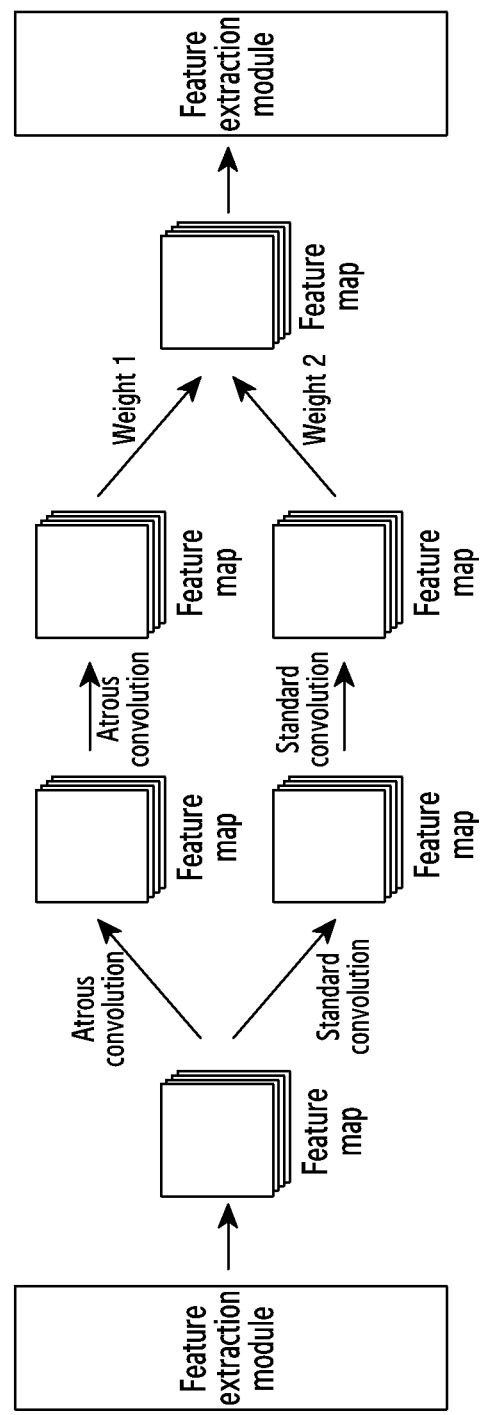
FIG. 32 is an exemplary diagram of a method of multi-receptive field processing of multi-branch provided by an embodiment of the present disclosure.

As shown in FIG. 32, taking two branches as an example, the feature maps output by the set feature extraction module are respectively processed by the receptive fields of two branches, wherein the receptive field processing of one branch may perform the Atrous convolution, and the receptive field processing of the other branch may perform the standard convolution. The two branches correspond to different parameter amounts, and the convolution kernel size may be the same, and the rate may be different. The fusion processing is performed on the feature map obtained by multiple convolution operations of each branch according to the corresponding weights, to obtain a feature map output by the receptive field processing module. For example, the weight corresponding to the Atrous convolution in FIG. 32 is weight 1, and the weight corresponding to the standard convolution is weight 2, and the feature maps of the two branches are fused according to weight 1 and weight 2.

In the above-described first implementation, the flow of the network training is consistent with the flow of the online processing.

In addition, when the feature extraction is performed according to the first implementation, since the multi-receptive field processing of multi-branches is performed in the feature extraction, the accuracy of feature extraction is greatly improved, and the processing speed is also improved.

The second implementation: the convolution parameter amount (the parameter amount in the convolution parameter) used in the convolution processing in each receptive field processing branch of any one receptive field processing module is the same, wherein the convolution kernel size may be the same (for example, all the convolution kernel size being 3*3), and the rate may be different. It may also be considered that the convolution operation of each branch shares the same parameter amount.

Figure 33:
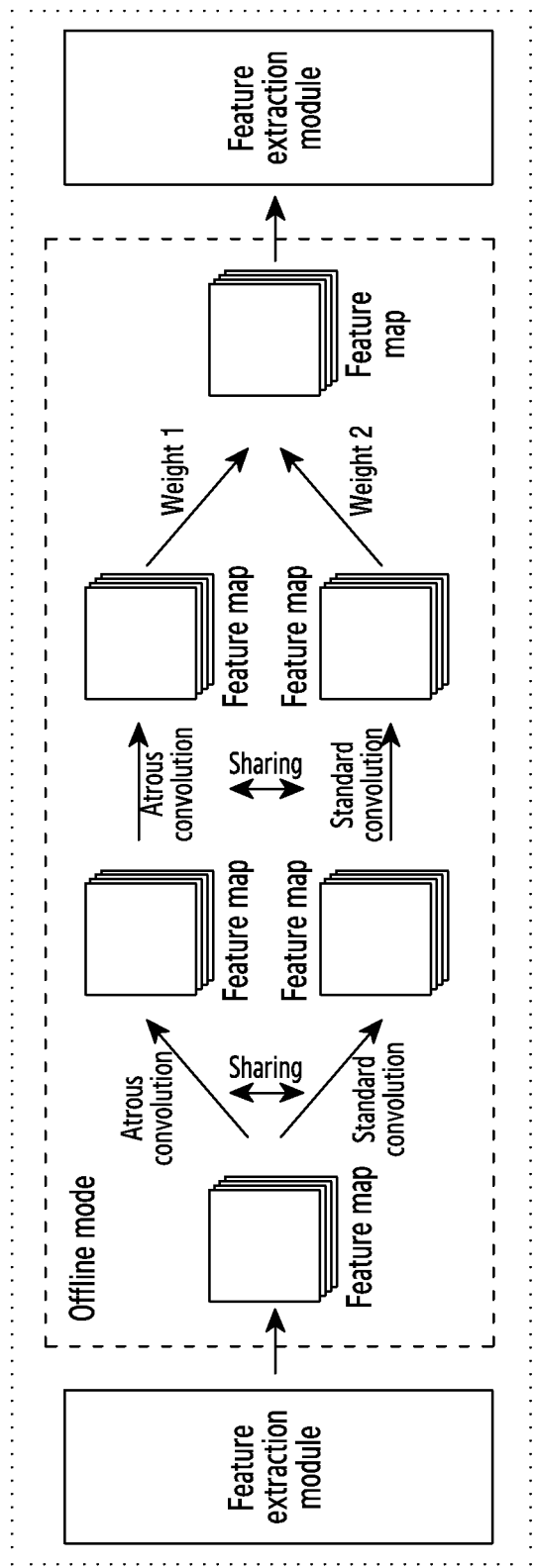
FIG. 33 is an exemplary diagram of another method of multi-receptive field processing of multi-branch provided by an embodiment of the present disclosure.

As shown in FIG. 33, taking two branches as an example, the feature maps output by the set feature extraction module are respectively processed by the receptive fields of two branches, wherein the receptive field processing of one branch may perform the Atrous convolution, and the receptive field processing of the other branch may perform the standard convolution, and the two branches correspond to the same parameter amount, that is, the convolution operations of the respective branch share the same parameter amount. The convolution kernel size of each branch may be the same, and the rate may be different. The fusion processing is performed on the feature maps obtained by the multiple convolution operations of each branch according to the corresponding weights to obtain the feature map output by the receptive field processing module. For example, the weights of the two branches are equal, both are ½, and the feature maps of the two branches are fused according to the above weights, that is, the output results of the two branches are averaged.

While performing the feature extraction according to the above-described second implementation, since the multi-receptive field processing of multi-branches is performed in the process of the feature extraction and the multi-receptive field processing of multi-branches uses a shared parameter amount, no new parameter amount is added, therefore, it is easier to converge while training the feature extraction network, therefore, the training is more stable, the accuracy of the feature extraction is greatly improved, and the processing speed is also improved.

In the above-described second implementation, the flow of the network training (which may also be referred to as an offline mode) and the flow of the online processing (which may also be referred to as an online mode) may be the same, for example, both as shown in FIG. 33.

Figure 34:
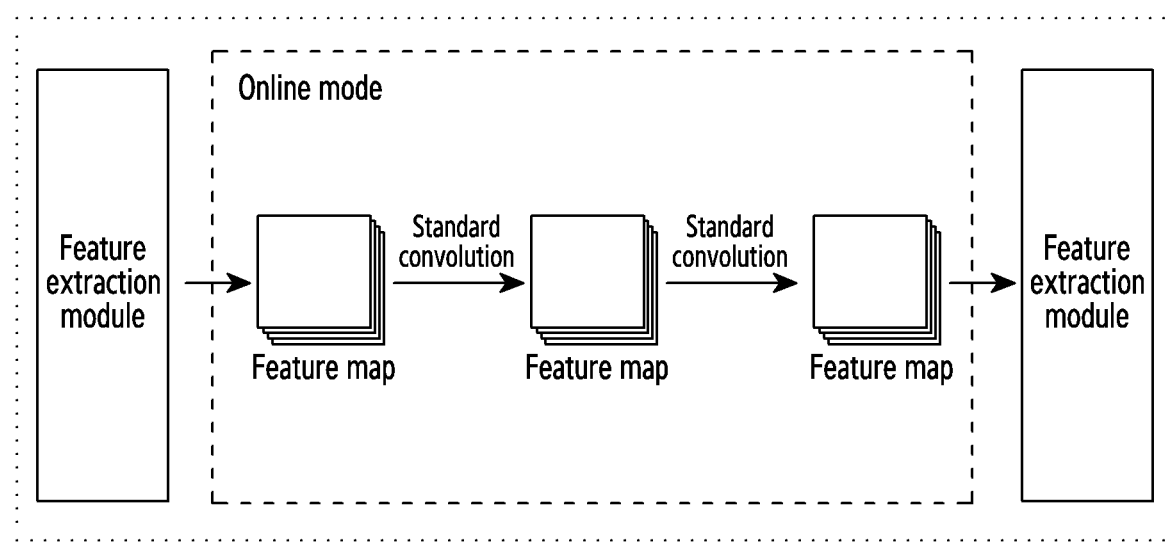
FIG. 34 is an exemplary diagram of still another method of multi-receptive field processing of multi-branch provided by an embodiment of the present disclosure.

In addition, the mode shown in FIG. 33 may also be used in the network training phase, and the mode shown in FIG. 34 may be used in the online processing flow. Only one branch of the training phase is reserved, the atrous convolution branch in FIG. 33 may be reserved, and the standard convolution branch in FIG. 33 may also be reserved. In other words, a receptive field processing module for the set feature extraction module of the feature extraction network is preset, and the receptive field processing module contains one branch. After passing through the above-described receptive field processing module, combined with the above, it may be known that the convolved feature map may be output to the next feature extraction module for feature extraction, or may be output to the next receptive field processing module, or subsequent operations (e.g. feature map processing and determination of category probability feature map) may be directly performed according to the fused feature map. This mode may greatly reduce the network computing time during online processing and improve the processing speed of the feature extraction.

Figure 35:
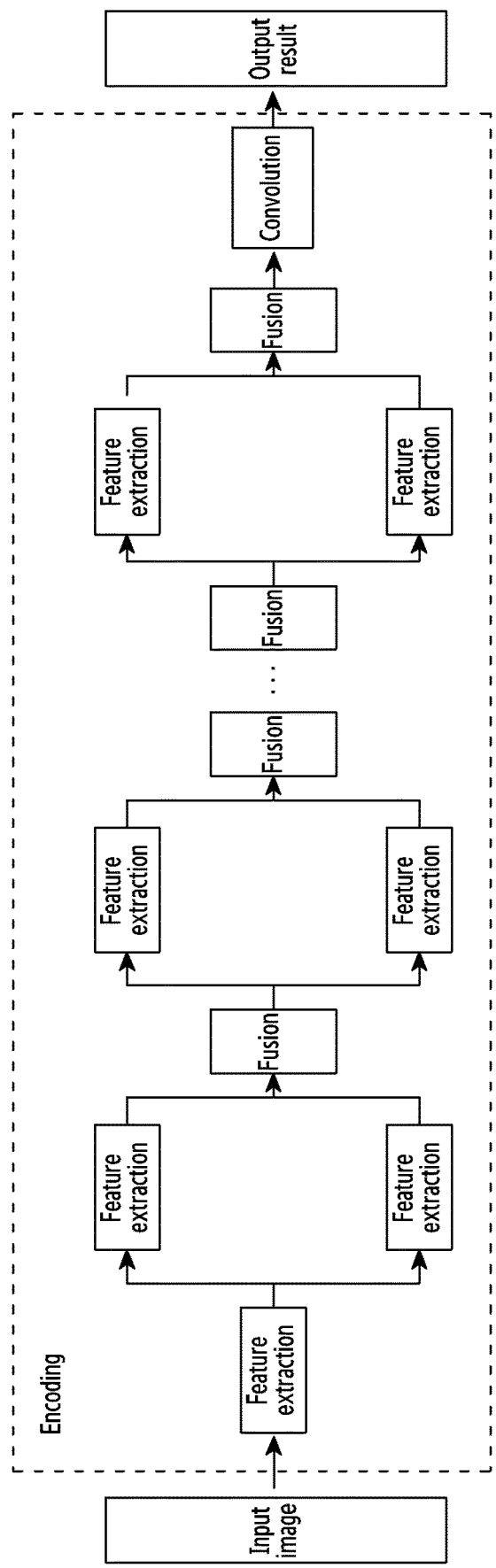
FIG. 35 is an exemplary diagram of a semantic segmentation network structure provided by an embodiment of the present disclosure.

In the above mode, the embodiment of the present disclosure proposes a semantic segmentation network structure as shown in FIG. 35, which fuses an original image into the network to perform feature extraction on the input image, and the employed network coding mode may be a network coding mode of Xception. The feature map output by the feature extraction is input to the receptive field processing module, wherein multiple receptive field extraction modules may be connected in series, and each receptive field extraction module may be divided into two branches, each of which has different receptive fields, each branch performs convolution processing (this process may also be considered as the feature extraction process) according to different receptive fields (i.e. corresponding to different convolution parameters), and the feature maps obtained by the two branches are fused and input to the next receptive field processing module. 1*1 convolution operation is performed on the fusion result output by the last receptive field processing module, and then category probability feature map is obtained by passing through the feature map processing, finally the category ID map is obtained, and the final segmentation result is output.

Embodiment 3

Figure 17A:
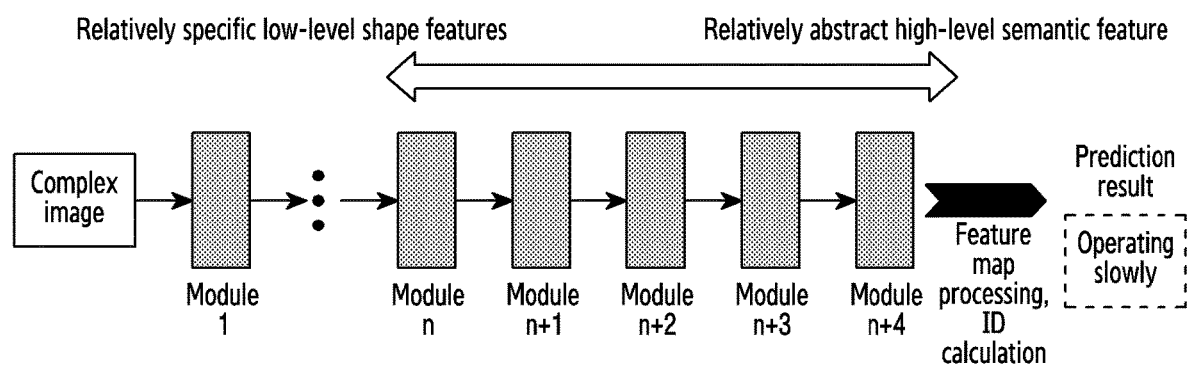
FIG. 17A is a schematic diagram of an existing feature extraction network provided by an embodiment of the present disclosure.
Figure 18:
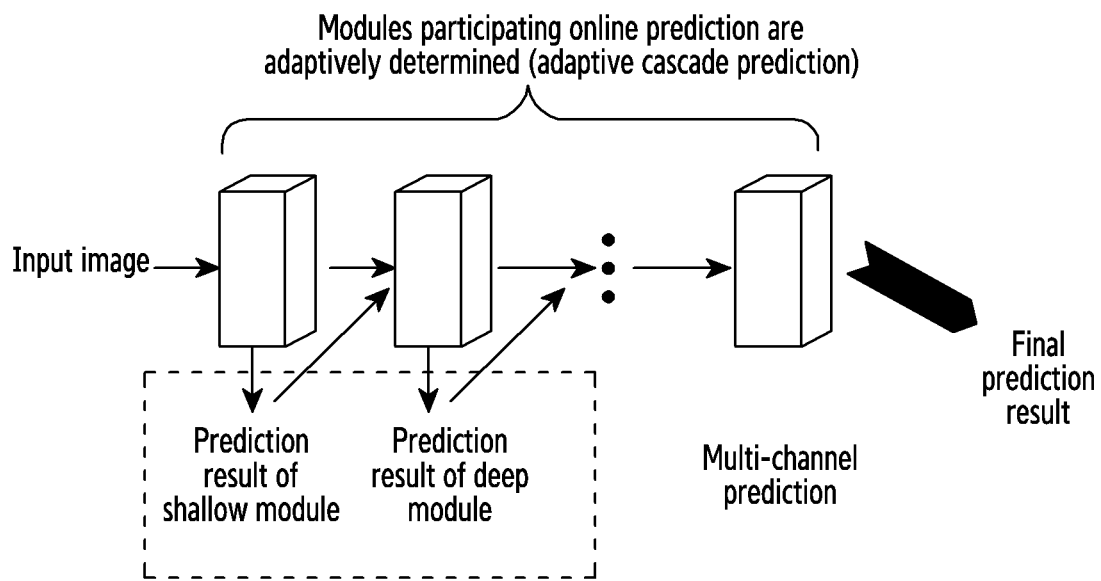
FIG. 18 is a schematic diagram of multi-channel adaptive cascade prediction provided by an embodiment of the present disclosure.

According to the solution provided by the embodiment of the present invention, the technical solution for feature extraction on an input image by using the adaptive cascade prediction mode and the multi-channel prediction mode is described in detail, which may solve above Difficulty 3, specifically:

In the embodiment of the present disclosure, for the technical solution of the method for performing feature extraction on an input image based on the cascading prediction, it is considered that general feature extraction network includes several feature extraction modules, and each module is composed of several network layers (such as a convolution layer, a pooling layer, a batch normalized layer, etc.). As shown in FIG. 17A, the deep module may extract abstract semantic features, and the shallow module may extract relatively specific low-level shape features. Images in most cases tends to be simple and may be recognized by shallow modules, therefore only requiring shallow feature extraction modules. On the other hand, images in complex scenes require deep feature extraction modules, as well as more parameters to extract relatively abstract high-level semantic features In the embodiment of the present disclosure, as shown in FIG. 18, the number of feature extraction modules participating in online prediction is adaptively determined by the input image. Whether requiring subsequent feature extraction module is determined by the confidence (corresponding to the category confidence above) calculated by the current module. The confidence may be based on a probability feature map of the prediction result, but is not limited thereto. If the confidence is greater than the set threshold, then the image is considered to have been well inferred by the current module without requirement of deep module. At this time, the network directly uses the feature extraction result as the output of the feature extraction network, and performs subsequent operation to obtain the prediction result, which the deep module is no longer used. In addition, the obtained category probability feature map may be directly output, and then the prediction result is obtained, which the step of feature map processing is not performed.

Figure 17B:
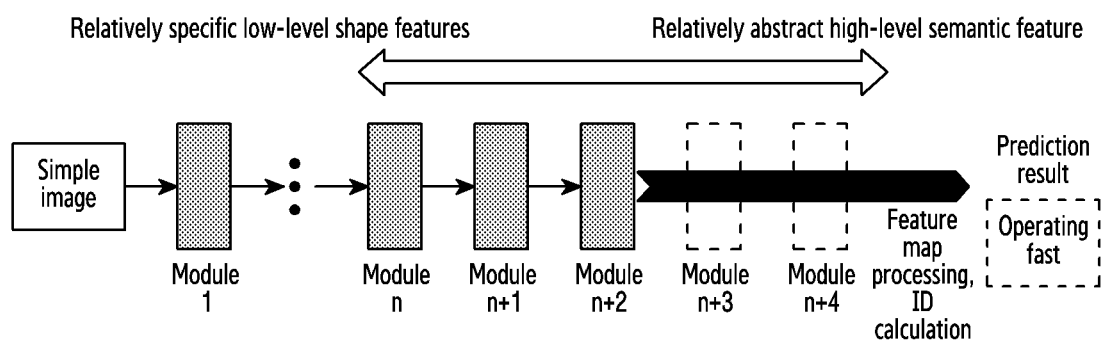
FIG. 17B is a schematic diagram of a feature extraction network provided by an embodiment of the present disclosure.

Referring to FIG. 17A and FIG. 17B, a comparison schematic diagram of the prior art and the method for cascade prediction of the embodiment of the present disclosure is shown. FIG. 17A is an operation flow of the prior art, in which an input image is successively processed by a complete feature extraction module (up to the module n+4), feature map processing, ID calculation, etc., and finally a category probability feature map is output, and then semantic segmentation result, i.e. the prediction result, is obtained. This method makes the network operate slowly and consume more computation. FIG. 17B is an operation flow of the cascade prediction of the embodiment of the present disclosure, in which the feature extraction process ends at module n+2 and then feature map processing phase is entered, and finally the category probability feature map is output to obtain the segmentation result. It may be seen that the present invention greatly reduces the amount of calculation (module n+3 and module n+4 are not operated), and speeds up the network operation.

Figure 19:
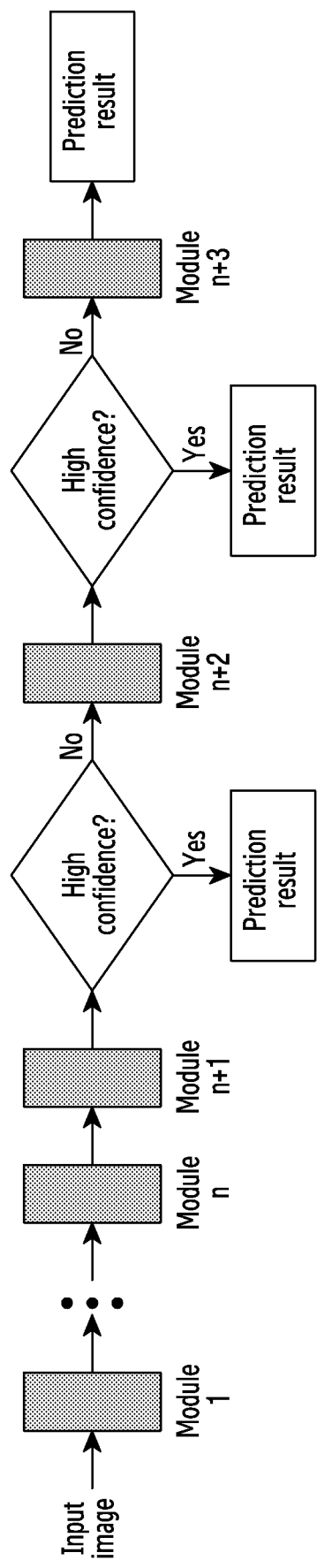
FIG. 19 is a schematic diagram of feature extraction based on a method for cascade prediction provided by an embodiment of the present disclosure.

In particular, the adaptive cascade prediction mode is used to perform feature extraction on the input image to obtain a feature map with reference to Step 4 and Step 5 above. The method is shown in FIG. 19 in simple terms:

Step SE: since shallow extraction module may only extract features in low layers (such as the contour of an object), the semantic information of the object is less, and it is difficult to predict the category of the object. Therefore, we generally apply the invention from the middle layer module of the network. For example, the depth of the entire network is 2n, and the method for cascading prediction is adopted starting from the $n^{th}$ or $(n*1)^{th}$ module.

Step SF: transmitting the feature extracted by the current module (depth>n) to the feature map processing module (may be unidirectional, or may be multi-directional in embodiment 1, which may select feature map processing scheme according to actual scene and device requirement, for example, in a mobile terminal or when requiring high real-time performance, the unidirectional feature map processing technology may be used and may improve processing speed), and outputting the category probability feature map.

Step SG: calculating the confidence according to the object category probability feature map, which higher confidence means greater assurance that the network judges the object category, indicating that the object or scene is relatively simple and belongs to a simple image. Otherwise, lower confidence means lower assurance that the network judges the image object category, indicating that the object or scene is complex and belong to difficult images. Herein, the confidence may be calculated in various ways, for example, in a simple manner referring to the manner of determining the category confidence in Step 4 above, and calculating the average value of the highest probability values of all pixels in the probability feature map as the confidence. Furthermore, a weighted average may be used, or a corresponding function may be set for calculation.

Step SH: comparing the confidence and a predefined threshold, referring to the manner in Step 5 above to confirm whether it is necessary to enter the next feature extraction for feature extraction. When greater than the threshold, the current feature extraction network is considered to capable of extracting features well for the input image, which does not need the subsequent deeper extraction module, and the feature map processing phase is directly entered to obtain the prediction result; or in Step SF, if using the manner of multi-directional feature map processing in Embodiment 1 to perform feature map processing, the category probability feature map may be directly outputted to obtain the prediction result without performing feature map processing phase. When less than or equal to the threshold, the current feature extraction module is not considered enough to perform feature map processing on the input image, which needs the subsequent deeper feature extraction. The above threshold may be obtained empirically and experimentally, a typical value is 0.8.

Figure 20:
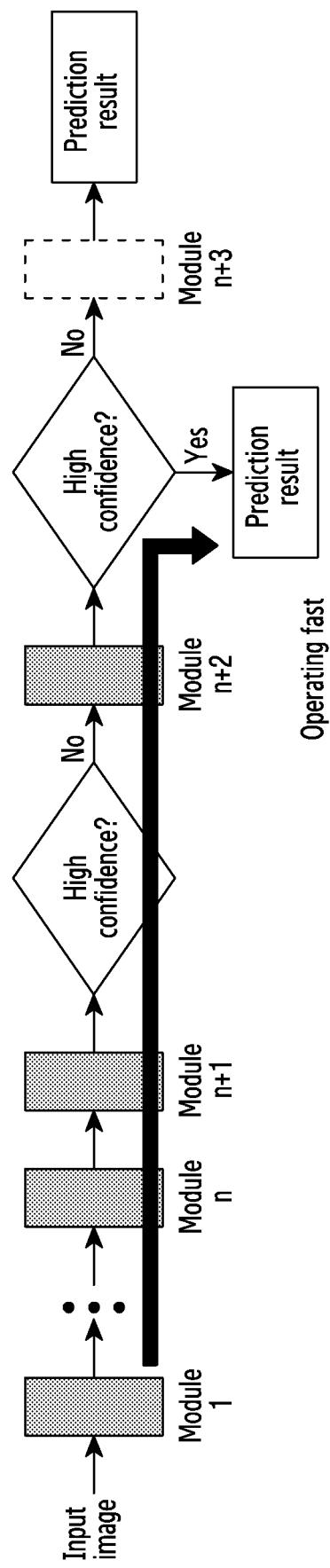
FIG. 20 is an exemplary diagram of feature extraction based on a method for cascade prediction method provided by an embodiment of the present disclosure.

Taking FIG. 20 as an example, at the feature extraction module n+1, adaptive cascade prediction is started. At n+1, since that the confidence is low, the subsequent feature extraction module is continued; at n+2, since that the confidence is greater than the threshold, the feature extraction process is ended, and the feature map processing module is directly entered. The value of n is determined according to the feature extraction module and actual application scene.

Figure 21:
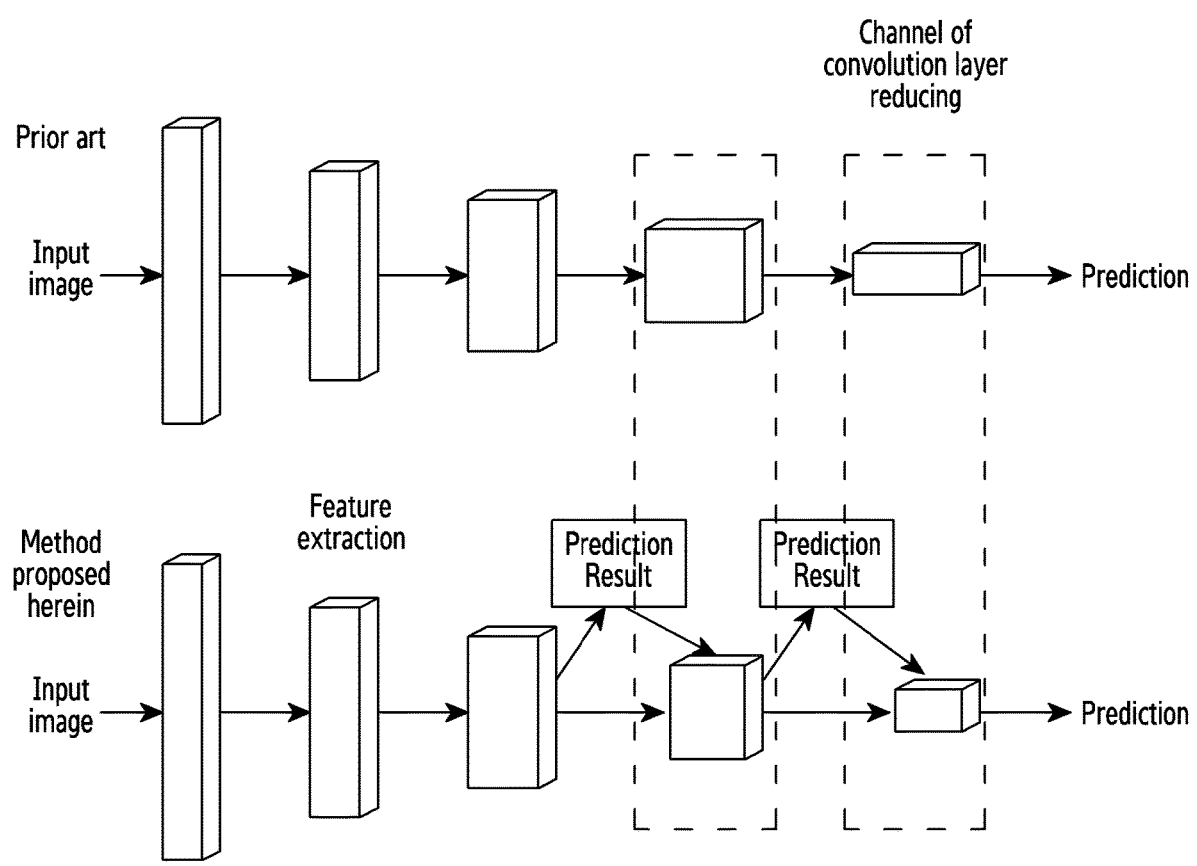
FIG. 21 is a schematic diagram of feature extraction based on a method for multi-channel prediction provide by an embodiment of the present disclosure.

In the embodiment of the present disclosure, for the technical solution for performing feature extraction on an input image based on the method for multi-channel prediction, it is considered that as shown in FIG. 21 in the prior art, features output by shallow feature extraction module and category probability feature map (the prediction result of the shallow module) processed by feature map processing is not used as the input of the latter feature extraction module. This has caused a certain degree of fragmentation and loss of relationship information among objects, and semantic information has not been fully utilized.

In particular, the feature extraction is performed on the input image by using multi-channel prediction mode, to obtain the feature map, which may be referred by Step 6 above, and in simple terms, be continued as shown in the lower part of FIG. 21.

Figure 22:
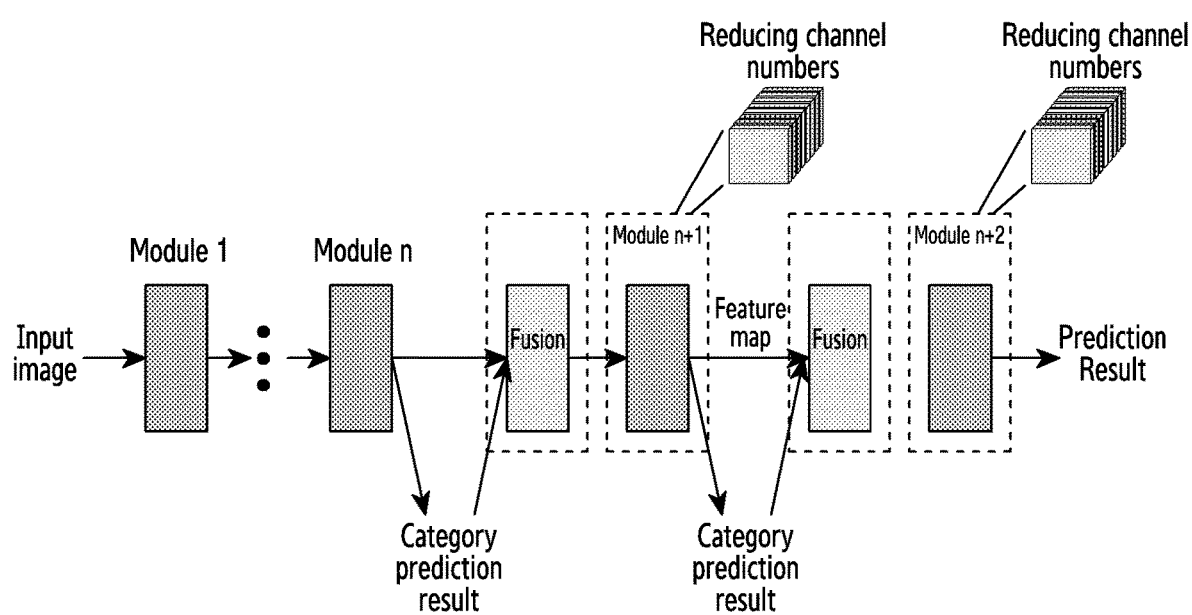
FIG. 22 is a schematic diagram of fusion operation of deep modules provided by an embodiment of the present disclosure.

The pixel category label (i.e. the prediction result) inferred by using the shallow module is another input of the deep module. The preliminary results of the shallow module contain semantic information among objects, for example people riding bicycles, which may guide the deep module to extract more spatial and semantic information. Since increase of input information and the need to reduce the prediction region, the number of channels of a convolution layer of a deep module may be correspondingly reduced without losing accuracy In particular, a fusion, of a feature map obtained based on a current feature extraction module and the category prediction result obtained based on a current feature extraction module, needs to be performed and input to a next feature extraction module for feature extraction. Simply, as shown in FIG. 22:

The shallow module passes the output feature map to the deep feature extraction module, together with the category prediction feature map (that is, the category prediction result) of the output feature map which has been processed by the feature map processing module. Referring to Step 6 above, if the output feature map and the category probability feature map are different in size, the fusion operation may be performed by passing through a fusion unit first, and the fused result is then entered into the subsequent feature extraction module. In this scheme, the typical structure of the fusion unit is that the output feature map and the category probability feature map pass through a convolution of a kernel size of 3*3 respectively, then the size of the feature map is adjusted to the same size, and then an adding operating is performed. It should be noted that the fusion unit is not limited to this structure, for example, concatenation and convolution may be used instead of the adding operation. If the size of the output feature map is as same as the category probability feature map, the fusion unit may be selected to be passed through according to the situation. For example, in case of prioritizing calculation speed, the two inputs may be directly transmitted to the subsequent deep feature extraction module without passing through the fusion unit. In case of prioritizing performance, for better interaction and fusion of information, a fusion unit may be passed through first, and then the result after fusion is transmitted to subsequent deep feature extraction module.

By fusing shallow feature maps and prediction results, the inferred result obtained by the shallow module may be used as another input of the deep module, which may transmit more spatial and semantic information, and improve the extraction performance of the effective features of the deep module for better semantic segmentation prediction. In this way, compared with prior art, the number of channels of the convolution layer in the deep module may be greatly reduced, and the specific degree of reduction is determined based on the feature extractor according to the experience and experiment. Taking the residual network ResNet as an example, the number of channels of the last two modules may be reduced maximally by ⅓, which may greatly save computing resources and time.

Figure 23A:
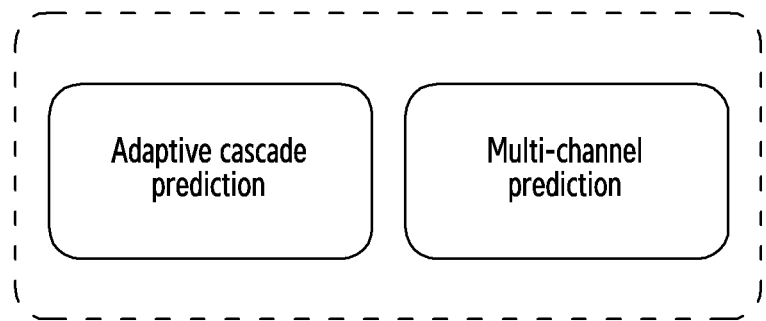
FIG. 23A is a schematic diagram of a multi-channel adaptive cascade prediction structure provided by an embodiment of the present disclosure.
Figure 23B:
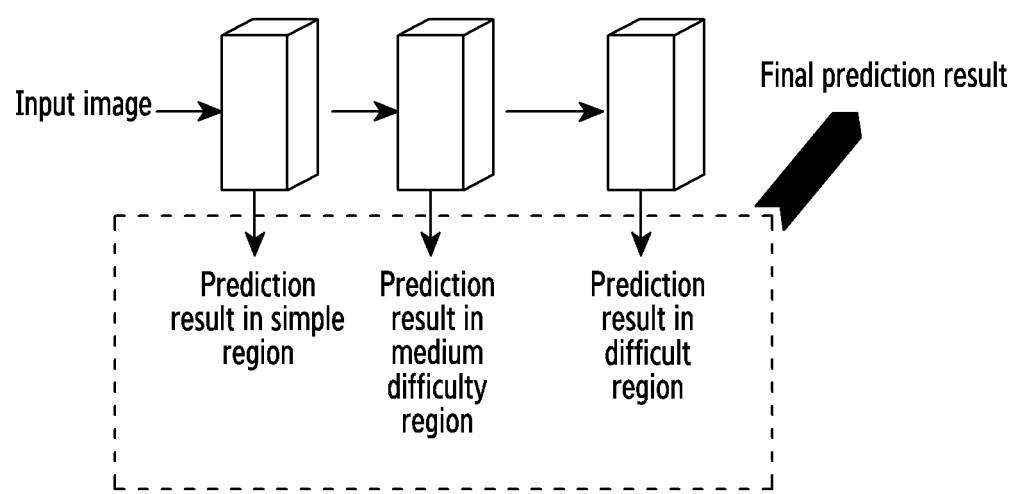
FIG. 23B is a schematic diagram of an existing semantic segmentation network structure provided by an embodiment of the present disclosure

In the embodiment of the present disclosure, as shown in FIG. 23A, a multi-channel adaptive cascade prediction structure is also provided, which includes both a cascade prediction function and a multi-channel prediction function. The main reason is that most of current methods use a fixed network structure for prediction, that is, the input image must pass through all arithmetic operation from the first layer to the last layer of the network to obtain an output result. The prediction result of the shallow module will not be input to the subsequent network, that is, the segmentation result of the shallow module is not used to guide presumption of the deep module. For example, a semantic segmentation network structure of the prior art in which a plurality of modules is connected in series is as shown in FIG. 23B. The input image is successively passed through three modules, which the first module first infers the relatively simple region of the image and transmits the remaining region to the second module for processing. The second module predicts the relatively simple region of the regions transmitted by the first module, that is, the medium difficulty region overall, and the remaining most difficult region is transmitted to the third module for processing. The third module finally outputs the prediction result of the regions with the highest difficulty. After forming a category ID map of three different regions that are simple, general, and difficult, they are fused to obtain the final semantic segmentation prediction result.

The above semantic segmentation network structure has two major problems: first, regardless of whether the scene or object in the input image is simple or not, each image has to pass through three complete modules. In the case of a simple scene, it is highly possible that the first module has a good output, but it will pass through the latter two cascade modules, which greatly wastes computation time and computing resources. Second, the simple region determined by the previous module will no longer enter the latter module. This has caused fragmentation and loss of relationship information among objects, for example for a picture of a person riding a bicycle, if the person has been segmented previously, only the rest part is transmitted to the latter module, and since the bicycle is complicated in shape and lacks the image of the person, the lack of full use of the semantic information that a person rides the bicycle may result in the pixels of the bicycle part not being accurately classified.

In order to solve the above problems, the multi-channel adaptive cascade prediction structure provided by the embodiment of the present disclosure is as shown in FIG. 18, in which modules truly participating in online prediction is adaptively determined by the input image, and the inferred result obtained by the shallow module is used as another input of the deep module, which may transmit more spatial and semantic information for better semantic segmentation prediction. Wherein, the specific method for cascading prediction and the method for multi-channel prediction, may refer to the above introduction, and details are not described herein again.

The multi-channel adaptive cascading prediction structure provided by the embodiment of the present disclosure at least comprises the following advantages: the number of feature extraction modules participating in online prediction is adaptively determined by the input image, and therefore the final result may be output only passing through several layers of networks. In addition, the number of convolution layer channels of the deep feature extraction module may be reduced accordingly. This design saves computation amount and speeds up network computing. Furthermore, the segmentation result of the shallow module may be used to guide presumption of the deep module and improve the semantic segmentation accuracy.

Embodiment 4

The solution provided by the embodiment of the present invention may solve the above Difficulty 4, specifically:

The loss function is applied in the offline training process of the model. The network performs backpropagation according to the calculated value of the loss function, and then updates the model parameters of each layer. In the field of semantic segmentation, the most common loss function is the cross-entropy loss function.

Cross entropy is used to evaluate the difference between the probability distribution obtained by the current training and the real distribution, that is, the distance between the probability of the actual output and the probability of the expected output. The smaller value of cross entropy is, the closer two probability distributions are. The reduction of cross entropy loss means improving the prediction accuracy of the model. Its discrete function form is:

$$H(p, q) = -\sum_x p(x) \log q(x)$$

wherein p(x) is the true distribution, q(x) is the estimated probability calculated by the data, and x is a pixel of the image. The average of the cross-entropy loss function of all the pixels in the image may be used as the loss function during the network training.

The inventors of the present disclosure found that the cross-entropy loss function is calculated according to a uniform formula for each pixel of the image, and there is no difference in position and belonging to the object category, which ignores the relationship between the pixels. For example, the cross entropy of pixels whose image edge belongs to background and the cross entropy of pixels whose image central region belongs to an object have the same weight when calculating average values, which objectively causes that the loss weight of the object category occupying a larger region in the image is greater than the loss weight of the object category with less pixels, such that the network is trained to have a better segmentation effect on the category with a large proportion of pixels in the training samples, and poor segmentation effect on the category with a small proportion of pixels.

However, the uneven distribution of objects of different categories in the training data is common in the training dataset of semantic segmentation, in which for some object categories, the cross-entropy loss function tends to ignore such objects since the corresponding training data is rare, and therefore, it will cause difficulties in network training and performance degradation, wherein such training samples are defined as difficult samples.

In summary, the cross-entropy loss function does not have the capability of processing difficult samples, and in order to alleviate the difficult sample problems caused by uneven data distribution, it is necessary to improve the cross-entropy loss function.

In the prior art, pixel-level difficult samples are mined, for example, by using a loss function focus loss:

$$FL(p_t) = \alpha_t (1-p_t)^\gamma \log(p_t)$$

Wherein $p_t$ is the probability of correctly predicted category, $\alpha_t$ is the scaling factor, and $\gamma$ is the index multiple. In the loss function, the object is segmenting to pixel-level difficulty samples to performing mining. Obviously, more easily the sample is segmented, the larger $p_t$ is, and the smaller the contribution to loss is. Accordingly, a smaller $p_t$ of difficult samples contributes more to the loss, and the loss function will trend to optimize difficult samples to achieve the goal of alleviating the uneven data during the training process.

The loss function processes the entire image as a pixel-level difficult sample, and each pixel is independent. However, in the semantic segmentation task, the pixel is not independent, but has a strong correlation (for example, belonging to the same object) with the pixels around thereof, therefore, the loss function is likely to cause discontinuity of the segmentation result, for example, there is a hole inside the object.

The embodiment of the present disclosure provides a new loss function Dloss. The loss function may increase the weight of the difficult-to-predict category, thereby effectively improving the overall semantic segmentation accuracy. The specific formula is as follows:

$$L(x, c) = \frac{1}{N}(L_{conf}(x, c))$$

$$L_{conf}(x, c) = -\sum_{i \in Pos}^{N} x_{ij}^p \log(\hat{c}_i^p) - \sum_{i \in Neg} \log(\hat{c}_i^0) \text{ where}$$

$$\hat{c}_i^p = \frac{\exp(c_i^p)}{\sum_p \exp(c_i^p)}$$

wherein N is the total number of pixels in the image, i is the predicted category, j is the actual category, $c_i$ is the probability that the pixel belongs to category i, p is the category whose prediction is consistent with the reality, $x_{ij}^p = \{0, 1\}$, indicating whether the prediction category is consistent with the reality.

If the probability $x_{ij}^p$ of the predicted category is greater than 0.8, the image content to which i belongs to a positive sample, and if the probability of the predicted category is less than 0.8, the image content to which i belongs to the negative sample.

The total target loss function during offline training is:

Loss=Segloss+α*Dloss wherein, Segloss is the cross-entropy loss function of the above standard, and α is the balance weight of Dloss and Segloss.

The new loss function Dloss provided by the embodiment of the present disclosure may be applied to each mode used in semantic segmentation process during offline training.

The new loss function considers data imbalances, making the training process more focused on samples containing fewer categories or categories difficult to be segmented, and improving accuracy of categories previously difficult to be segmented.

The reason for retaining Segloss here is that Segloss plays a more important role in the final training process, and Dloss only enhances training of difficult samples, which improves the overall semantic segmentation accuracy.

Embodiment 5

According to the requirements of application scene and hardware environment, the above embodiments may have different combinations to form different semantic segmentation schemes. The following are example of three online prediction schemes and one offline training scheme. Those skilled in the art should understand that the following schemes are merely examples, and appropriate changes based on these examples may also be applicable to the present invention, which should also be included in the protection scope of the present invention.

Figure 24:
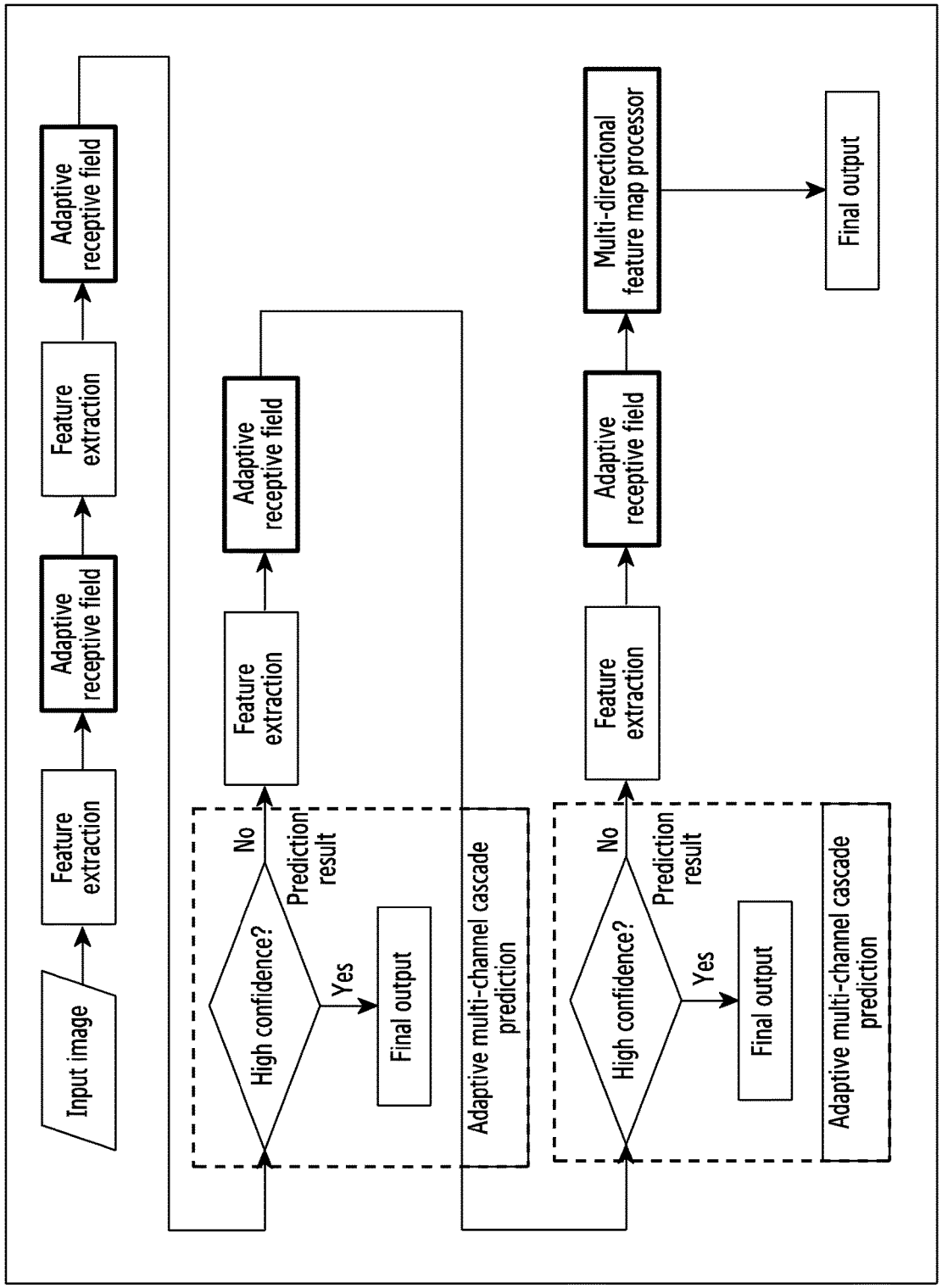
FIG. 24 is a schematic diagram of online prediction scheme one provided by an embodiment of the present disclosure.

Online Prediction Scheme 1: High Performance Online Prediction Scheme for Mobile Terminals The integrated scheme considers both the operation speed and actual performance, is applicable to the scene including the mobile terminals and having high-performance requirement, and completes high-accuracy online semantic segmentation prediction for mobile terminals As shown in FIG. 24, the camera of the mobile device collects images, and the image enters feature extraction sub-network of feature extraction network for feature extraction. The sub-network of feature extraction network consists of several feature extraction modules and adaptive receptive field modules by cascading, and uses adaptive multi-channel cascade prediction mode to determine the number of modules that actually participate in feature extraction during online prediction, i.e., directly output to the multi-directional feature map processor if it is a high confidence, otherwise it will enter the next feature extraction module. The feature map extracted by the feature extraction sub-network of feature extraction network, is subject to feature map processing by the multi-directional feature map processor, and finally the category probability feature map is output, thus the semantic segmentation prediction result is obtained. In this integrated scheme, four general feature extraction modules and four adaptive receptive field modules are used to form a feature extraction sub-network of feature extraction network. The adaptive multi-channel cascade prediction is applied starting from the third feature extraction module. It should be noted that the number of modules of the feature extraction sub-network of feature extraction network and the starting position of the multi-channel cascade adaptive prediction may be adjusted according to specific hardware environments and application scenes. The higher the performance requirement, the more the modules of feature extraction network subnetwork, and the more backward the multi-channel cascade adaptive prediction starting position.

Online Prediction Scheme 2: Online Prediction and Fast Response Scheme for Mobile Terminals The integrated scheme is prioritized by operating speed, and is applicable to the scene including the mobile terminals and having operating speed and operating resource requirements, to complete a fast-responds online semantic segmentation prediction for mobile terminals.

Figure 25:
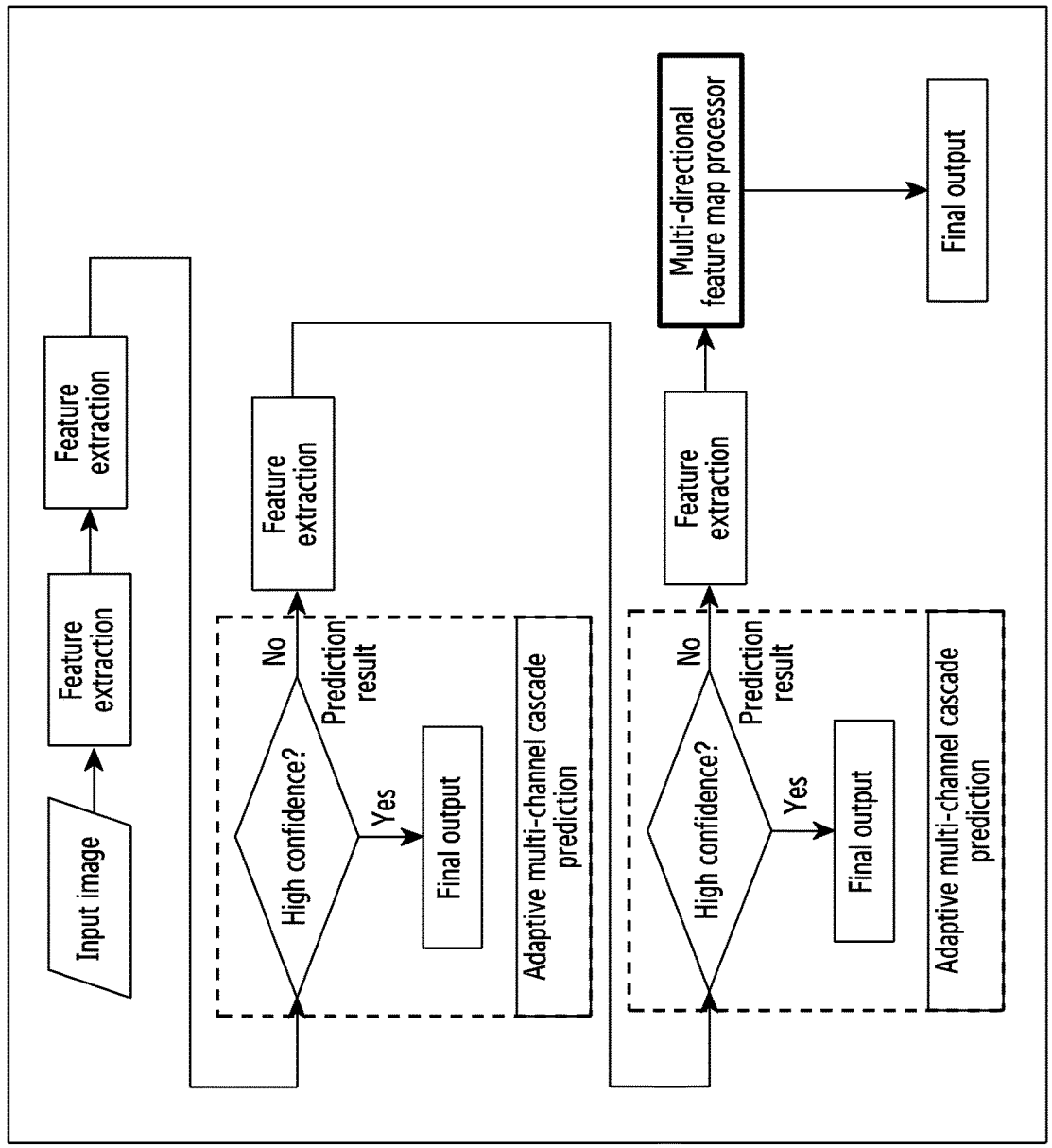
FIG. 25 is a schematic diagram of online prediction scheme two provided by an embodiment of the present disclosure.

Since the adaptive receptive field module requires relatively long operating time, the module is removed from this integration scheme, as shown in FIG. 25. Besides, other operating flows are the same as high performance online prediction scheme for mobile terminals (Online Prediction Scheme 1). This integrated scheme still takes the feature extraction network composed of four general feature extraction modules as an example. The solution may quickly calculate the semantic segmentation of images collected by mobile devices, and is applicable to scenes having high requirement of real-time performance and tight computing resources.

Online Prediction Scheme 3: Online High-Performance Prediction Scheme of Server-Side This integrated solution is prioritized by operating performance and is applicable to the server side to complete high-performance online semantic segmentation prediction.

Figure 26:
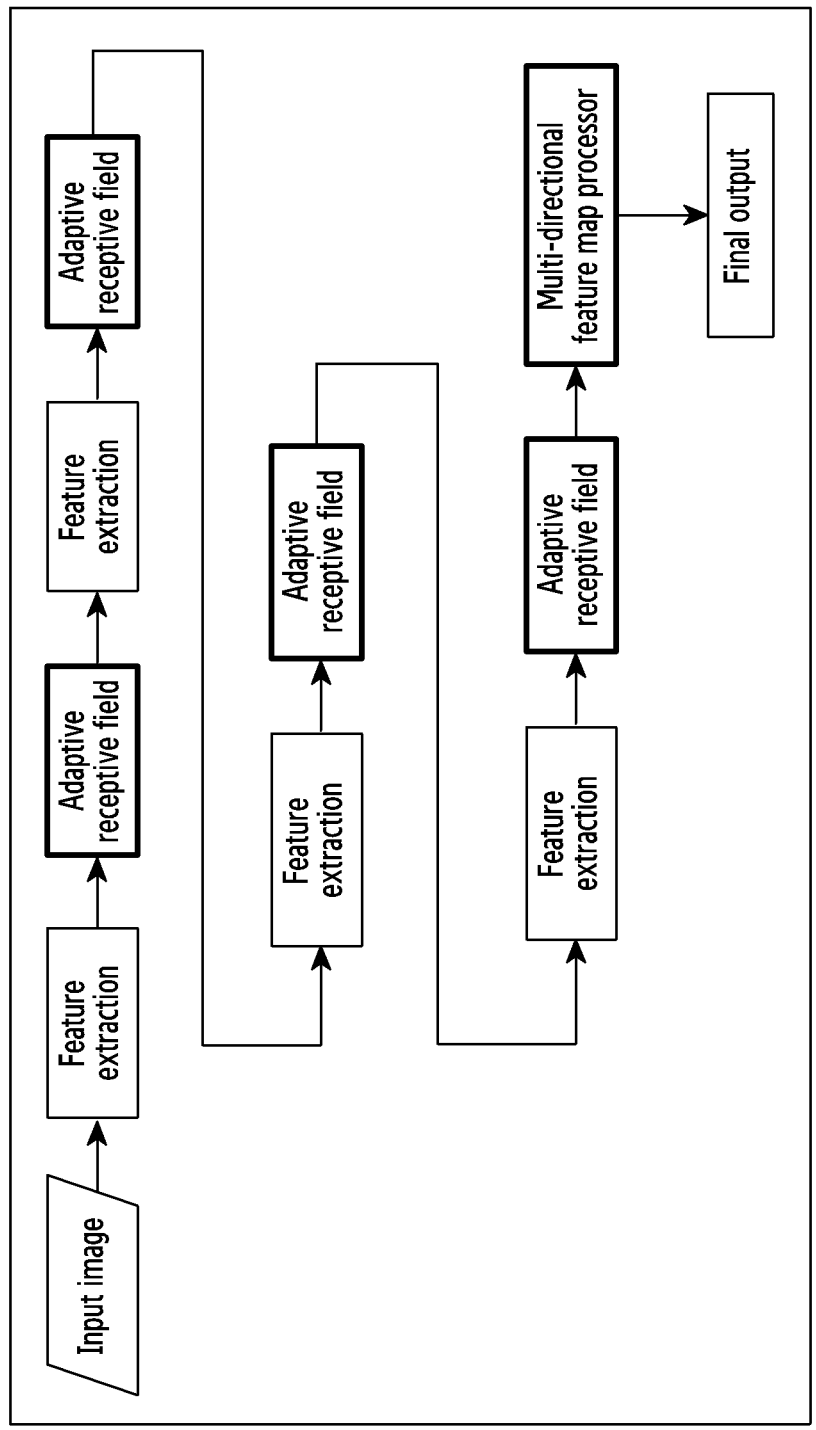
FIG. 26 is a schematic diagram of online prediction scheme three provided by an embodiment of the present disclosure.

The server-side computing resources are abundant, so the multi-channel adaptive cascade prediction module which is used for speeding up the operation may be removed, and all feature extraction networks are used for unified prediction, as shown in FIG. 26, to ensure accuracy and stability of the calculation results.

Figure 27:
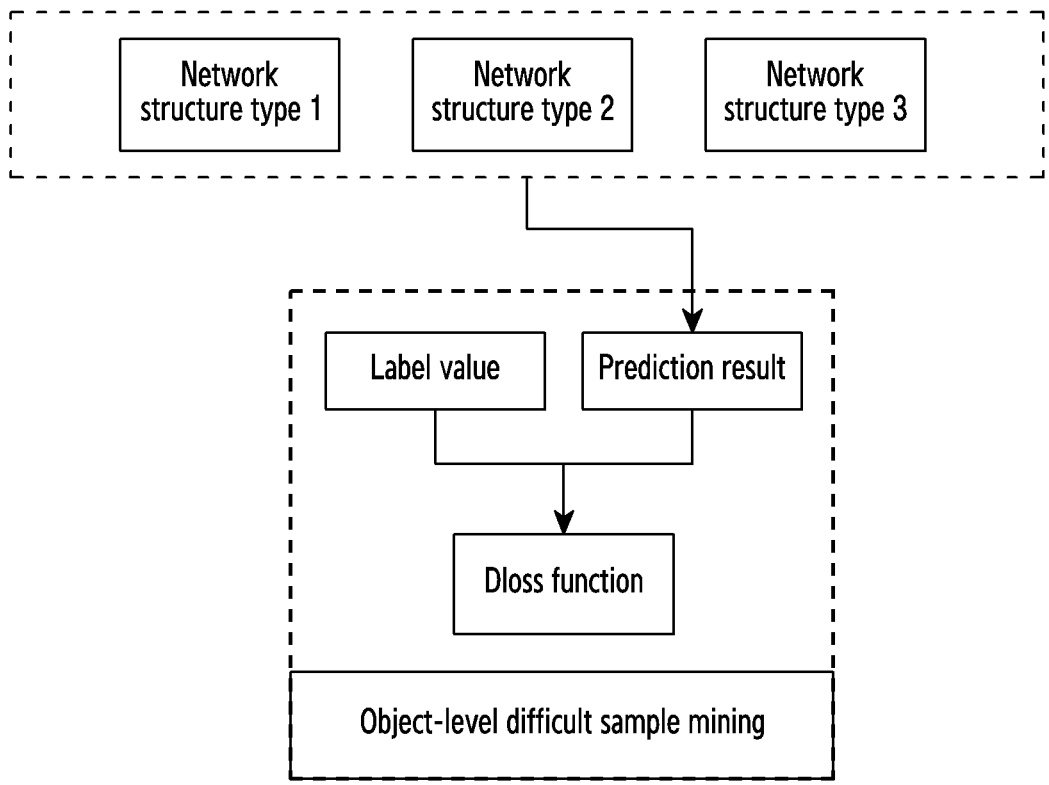
FIG. 27 is a schematic diagram of an offline training solution provided by an embodiment of the present disclosure.

Offline Training Scheme:

The structures in the above three online prediction schemes (corresponding to the network type structure 1-3 in the Figure) may be trained offline using the same framework. As shown in FIG. 27, the D loss function (Dloss) is used to perform object-level difficult sample mining to solve the problem of uneven data distribution. Wherein, the Dloss function is obtained according to the label value and the prediction result.

Embodiment 6

Semantic segmentation is widely used in intelligent driving, robot interaction, image processing (such as artificial intelligence (AI) editing on images, medical image processing, remote sensing image processing, etc.), virtual reality (VR)/augmented reality (AR, such as virtual fitting), etc.

a. Robot interaction: semantic segmentation is performed on images collected by a robot to obtain ID map of objects, and according to the ID map, the robot may sense object category and position of each object in an indoor scene, and subsequently execute corresponding commands for a certain object, for example, execute a command instructed by a user such as "take an apple on the table";

b. AR/VR: semantic segmentation is performed on images containing faces of people to obtain shape and category ID of each part of the human face, followed by corresponding AR/VR interaction processing according to shape of the obtained part and the category ID, for example, adding beauty to human face and adding dynamic emoticons, etc.

c. Road segmentation: a semantic segmentation is performed on the collected image of road surface to segment the road part, and then the travelable region may be determined, and corresponding auxiliary reminders (in the assisted driving scene, the travelable region may be identified in the image to remind the user) are provided according to the travelable region, or to carry out corresponding driving treatment.

d. Virtual fitting: semantic segmentation is performed on a collected picture of human dressing to obtain various parts of the person and the dressing region, and the clothes may be replaced later.

e. AI editing: semantic segmentation is performed on a collected image to segment the background region, human body region or user face region, and according to the segmented regions, intelligent image processing may be performed, for example, background replacement, regional style conversion, etc.

The following describes an application scene of the method for image segmentation provided in present application.

(1) Automatic Driving

Automatic driving requires precise perception of driving scenes in real time and the establishment of a suitable scene model, in which semantic segmentation is indispensable. Using images collected by the vehicle-mounted camera for semantic segmentation, pixel-level positioning accuracy enables accurate contouring of the vehicle, collaborating with other sensors may achieve accurate side distance calculation. Meanwhile, the detected elements such as the guardrails, lane lines and road surfaces may be used in auxiliary judgment of the accurate position of the vehicle. Finally, with perception of the entire scene, multiple sensors and modules may be unified into one framework, making it easy to integrate data and cross-validate.

Figure 28:
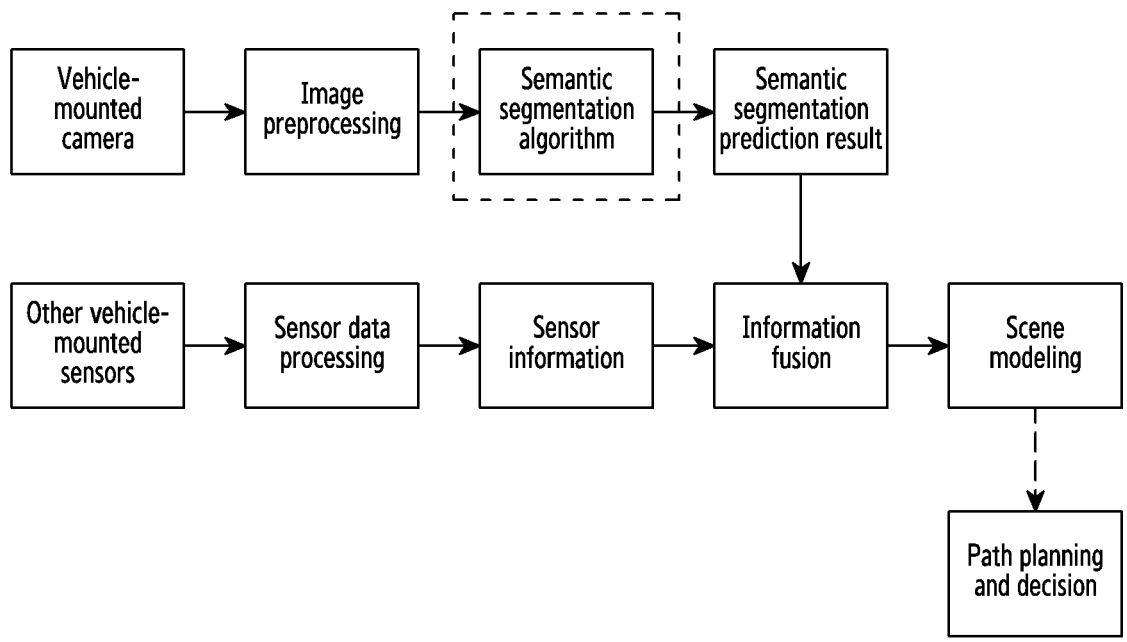
FIG. 28 is a schematic diagram of environment sensing of a vehicle-mounted sensor provided by an embodiment of the present disclosure.

Referring to FIG. 28, it is a schematic diagram of environment sensing of vehicle-mounted sensors. A high-definition image obtained by a vehicle-mounted camera is preprocessed and transmitted to a semantic segmentation network to obtain the prediction result of semantic segmentation. On the other hand, the data obtained from other vehicle-mounted sensors (such as a laser radar) is processed by the sensor data to obtain sensor information, and information fusion is performed with semantic segmentation prediction results, and finally the 3D scene model of the road may be generated in real time, that is, the scene modeling is performed. Driving route may be planned and decided based on the conditions such as roads, pedestrians and vehicles. It may be noted that in the above flows, semantic segmentation plays an irreplaceable role. Accuracy and operating speed are essential requirements. According to actual situation, when in the area with good communication conditions and the driving speed is low, the server-side online prediction high-performance scheme may be employed to communicate with a cloud server. The collected images are transmitted to the cloud server in a certain frame rate, and the semantic segmentation result of the cloud server may be received, thereby reducing the consumption of the on-board computing resource. In the case of poor communication conditions or high real-time frame rate requirements, the online high-performance prediction scheme of mobile terminal is used, and the segmentation result is obtained by using the vehicle-mounted computing device.

In the above semantic segmentation algorithm, if the current auto-driving scene requires relatively high real-time segmentation, during performing a multi-directional feature processing, then it is possible to set the convolution mode and convolution parameters in up-down direction and/or left-right direction are different from these in front-rear direction. The Atrous convolution may be used in front-rear direction, and the depthwise convolution may be used in up-down direction and left-right direction, and smaller and fewer convolution kernels may be used in up-down direction and left-right direction. Furthermore, the above mentioned adaptive receptive field module may be applied only to the last key convolution layer in the feature extraction phase.

If current automatic driving scene requires high segmentation performance, then it is possible to set the convolution mode and convolution parameters in up-down direction and/or left-right direction to be consistent with these in front-rear direction. In addition, the above mentioned adaptive receptive field module may be applied to at least two key convolution layers, or each convolution operation may be replaced with an adaptive receptive field operation.

(2) Mobile phone Photographed Portrait Segmentation

Figure 29:
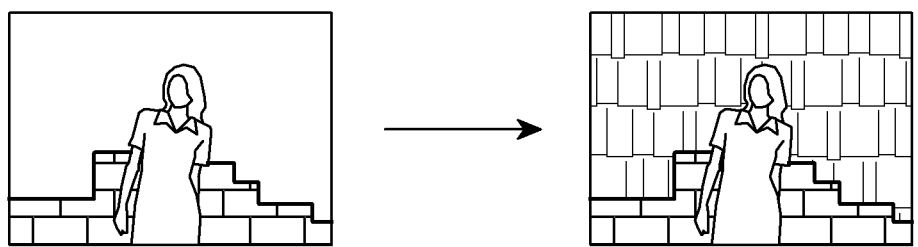
FIG. 29 is a schematic diagram of image editing provided by an embodiment of the present disclosure.

Portrait photography is an important function and application of mobile phones. As the basic technology of image editing, the importance of portrait and object segmentation is self-evident. As shown in the example in FIG. 29, we can shoot people and generate some special effects.

Figure 30:
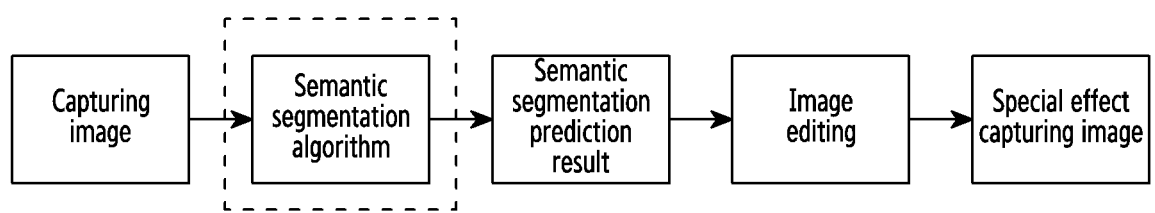
FIG. 30 is a schematic diagram of a special effect capturing image provided by an embodiment of the present disclosure.

With the method for image segmentation provided by the present disclosure, accurate character and object segmentation may be obtained. As shown in FIG. 30, the captured image is transmitted to the semantic segmentation network to obtain a predicted result graph, that is, the semantic segmentation prediction result, and then the background is replaced as needed or the local style conversion is performed, that is, image editing, and finally, an image having a special effect is generated. The semantic segmentation part may use the online high-performance prediction scheme of mobile terminals to obtain more accurate segmentation results. Since capturing with special effects mostly requires interactive operation and has a certain time tolerance and balance of speed and accuracy, which the scheme may satisfy requirements of operating time and accuracy.

In the above semantic segmentation algorithm, if the current image-editing scene requires relatively high real-time segmentation (for example, when applying in an AR camera, it is necessary to edit images in the preview state in real time), during performing a multi-directional feature processing, then it is possible to set the convolution mode and convolution parameters in up-down direction and/or left-right direction are different from these in front-rear direction. The Atrous convolution may be used in the front-rear direction, and the depthwise convolution may be used in up-down direction and left-right direction, and smaller and fewer convolution kernels may be used in up-down direction and left-right direction. In addition, the above-mentioned adaptive receptive field module may be applied only to the last key convolution layer in the feature extraction phase.

If current image-editing scene (for example, post-processing on images) requires high segmentation performance, then it is possible to set the convolution mode and convolution parameters in up-down direction and/or left-right direction to be consistent with these in front-rear direction. In addition, the above mentioned adaptive receptive field module may be applied to at least two key convolution layers, or each convolution operation may be replaced with an adaptive receptive field operation.

Embodiment 7

Figure 31:
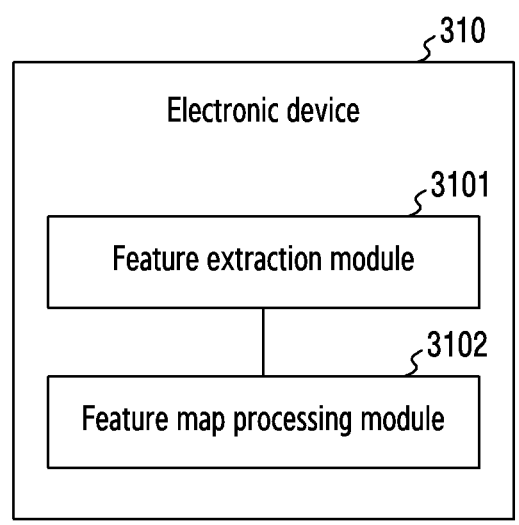
FIG. 31 is a schematic structural diagram of an electronic device provided by an embodiment of the present disclosure.

The embodiment of the present disclosure provides an electronic device. As shown in FIG. 31, the electronic device 310 comprises a feature extraction module 3101 and a feature map processing module 3102, wherein, the feature extraction module 3101 is configured to perform feature extraction on an image, through a feature extraction network, to obtain a feature map;

the feature map processing module 3102 is configured to perform feature map processing on the feature map to complete semantic segmentation of the image.

Alternatively, the feature map processing module 3102 is specifically configured to perform feature map processing for at least two directions of the feature map.

Alternatively, the feature map processing module 3102 is specifically configured to perform convolution operation and/or pooling operation for the at least two directions of the feature map, respectively; and, perform fusion processing on the operation results of the at least two directions.

Alternatively, the feature map processing module 3102 is specifically configured to perform convolution operation for the at least two directions of the feature map, according to a convolution mode and/or a convolution parameter corresponding to each direction;

and/or, the feature map processing module 3102 is specifically configured to perform pooling operation for the at least two directions of the feature map, according to a pooling mode and/or a pooling parameter corresponding to each direction.

Alternatively, the feature map processing module 3102 is specifically configured to determine a convolution mode and/or a convolution parameter corresponding to each direction, according to a device status and/or a task requirement.

Alternatively, the at least two directions comprises a set main direction of the feature map; the feature map processing module 3102 is also configured to determine convolution modes and/or convolution parameters corresponding to other directions, according to the convolution mode and/or the convolution parameter corresponding to the main direction of the feature map;

and/or, the feature map processing module 3102 is also configured to determine pooling modes and/or pooling parameters corresponding to other directions, according to a pooling mode and/or a pooling parameter corresponding to the main direction of the feature map.

Specifically, the convolution parameter comprises at least one of a convolution kernel size, a dilation rate, a convolution step size, and a parameter amount; and/or, the pooling parameter comprises at least one of a pooling kernel size and a pooling step size.

Alternatively, the feature map processing module 3102 is specifically used in any of the following situations:

performing fusion processing on a convolution operation result of each direction, if performing convolution operation for the at least two directions of the feature map respectively;

performing fusion processing on a pooling operation result of each direction, if performing pooling operation for the at least two directions of the feature map respectively;

performing fusion processing on a convolution operation result and a pooling operation result of each direction, if performing convolution operation and pooling operation for the at least two directions of the feature map simultaneously and respectively;

performing fusion processing on a pooling operation result of each direction, if performing convolution operation and pooling operation for the at least two directions of the feature map successively and respectively.

Alternatively, the feature map processing module 3102 is specifically configured to determine a fusion weight and/or feature offset information corresponding to each operation result, for each operation result of the at least two directions; and, perform a predetermined processing on each operation result according to the fusion weight and/or the feature offset information; and, perform fusion processing on each operation result after a predetermined processing.

Alternatively, the feature map processing module 3102 is also configured to perform a skip connection processing on the operation result and an output result of the operation result in which passing through a predetermined processing, respectively, for each of operation results of the at least two directions;

The feature map processing module 3102 is also configured to perform fusion processing on each skip-connection processed operation result.

Alternatively, the feature map processing module 3102 is configured to at least one of the following:

performing weighting processing on each operation result respectively, according to the fusion weight;

performing weighting processing on each weighting-processed output result respectively, according to the fusion weight;

performing weighting processing on each offset-processed output result respectively, according to the fusion weight;

performing weighting processing on each skip-connection-processed output result respectively, according to the fusion weight;

performing offset processing on each operation result respectively, according to the feature offset information;

performing offset processing on each weighting-processed output result respectively, according to the feature offset information;

performing offset processing on each offset-processed output result respectively, according to the feature offset information;

performing offset processing on each skip-connection-processed output result respectively, according to the feature offset information.

Alternatively, the feature map processing module 3102 is also configured to determine corresponding channel correlation features according to a feature map obtained by combining operation results for the at least two directions;

the feature map processing module 3102 is configured to determine a fusion weight corresponding to each of the operation results of the at least two directions respectively, according to the channel correlation features;

the feature map processing module 3102 is configured to determine feature offset information corresponding to each of the operation results of the at least two directions respectively, according to the channel correlation features.

Alternatively, the feature extraction module 3101 is specifically configured to execute:

Step 1: performing, for a set convolution layer in the feature extraction network, convolution processing on the image or an input feature map according to a convolution parameter corresponding to the set convolution layer;

Step 2: performing feature map processing on a feature map obtained by convolution processing to obtain a category probability feature map, and determining a category confidence according to the category probability feature map;

Step 3: if confirming that it is necessary to adjust the convolution parameter corresponding to the set convolution layer based on the category confidence, adjusting the convolution parameter corresponding to the set convolution layer and then performing Step 1, and if confirming that it is not necessary to adjust the convolution parameter corresponding to the set convolution layer based on the category confidence, outputting a feature map obtained by convolution processing.

Alternatively, the set convolution layer is at least one convolution layer whose depth is greater than a second depth threshold, in at least one feature extraction module whose depth is greater than a first depth threshold.

Alternatively, the electronic device 310 further comprises a set convolution layer determining module, wherein, the set convolution layer determining module is specifically configured to select at least one key convolution layer from at least one feature extraction module as the set convolution layer, wherein the set convolution layer is the key convolution layer whose depth is greater than the first depth threshold in feature extraction module;

the set convolution layer determining module is specifically configured to select at least one convolution layer as the key convolution layer from feature extraction modules, wherein the key convolution layer whose depth is greater than a second depth threshold in the feature extraction module.

Alternatively, the feature map processing module 3102 is specifically configured to confirm whether it is necessary to adjust the convolution parameter corresponding to the set convolution layer in the following manners: when the category confidence is greater than a first predetermined threshold, confirming that it is not necessary to adjust the convolution parameter corresponding to the set convolution layer; otherwise, confirming that it is necessary to adjust the convolution parameter corresponding to the set convolution layer.

Alternatively, the feature extraction module 3101 is further configured to: if total number of iterations are not less than a first predefined iteration number threshold, and/or the number of iterations of the set convolution layer is not less than a second predefined iteration number threshold, confirming that it is not necessary to adjust the convolution parameter corresponding to the set convolution layer, and outputting a feature map obtained by convolution processing.

Alternatively, the feature extraction module 3101 is specifically configured to determine a parameter variation corresponding to the set convolution layer; and, adjust a convolution parameter corresponding to the set convolution layer based on the parameter variation.

Alternatively, the feature extraction module 3101 is specifically configured to determine a parameter variation corresponding to the set convolution layer, according to the category confidence.

Alternatively, the feature extraction module 3101 is specifically configured to perform receptive field processing on the feature map extracted by a set feature extraction module, by at least one receptive field processing module, to obtain a receptive-field-processed feature map.

Alternatively, the receptive field processing module contains at least one receptive field processing branch;

the feature extraction module 3101 is specifically configured to perform convolution processing on the feature map output by the set feature extraction module or by a previous receptive field processing module, by each receptive field processing branch of a current receptive field processing module respectively, to obtain each convolved feature map; and to perform fusion processing on each convolved feature map, based on a weight corresponding to each receptive field processing branch of a current receptive field processing module.

Alternatively, convolution parameter amount used in the convolution processing by each receptive field processing branch of any one receptive field processing module is the same.

Alternatively, the set feature extraction module comprising any one of the following:

any one feature extraction module in the feature extraction network; and any one feature extraction module, whose depth is greater than a third deep threshold, in the feature extraction network.

Alternatively, the feature extraction module 3101 is specifically configured to perform feature map processing on a feature map extracted by a current feature extraction module to obtain a category probability feature map, and determine a category confidence according to the category probability feature map; and, if confirmed that it is necessary to enter a next feature extraction module for feature extraction based on the category confidence, output a feature map extracted by a current feature extraction module to a next feature extraction module, and if confirmed that it is not necessary to enter a next feature extraction module for feature extraction based on the category confidence, output a feature map extracted by a current feature extraction module as a feature map output by the feature extraction network or output the category probability feature map.

Alternatively, the feature extraction module 3101 is specifically configured to confirm whether it is necessary to enter a next feature extraction module for feature extraction in the following manners: if the category confidence is greater than a second predetermined threshold, confirm that it is not necessary to enter a next feature extraction module for feature extraction; otherwise, confirm that it is necessary to enter a next feature extraction module for feature extraction.

Alternatively, the feature extraction module 3101 is specifically configured to determine a maximum probability of each pixel in the category probability feature map; and determine a category confidence based on an average of the maximum probability of each pixel.

Alternatively, the feature extraction module 3101 is specifically configured to input a feature map obtained based on a current feature extraction module and a category prediction result obtained based on a current feature extraction module, to a next feature extraction module for feature extraction.

Alternatively, the feature extraction module 3101 is specifically configured that the feature map obtained based on a current feature extraction module and the category prediction result obtained based on a current feature extraction module are fused and input to a next feature extraction module for feature extraction An implementation principle and a technical effect produced of the electronic device provided by the embodiments of the present disclosure are the same as those in the foregoing method embodiments. For the purpose of concise description, for parts not described in the device and system embodiments, refer to corresponding contents in the method embodiment, and will not be repeated here. The electronic device provided by the embodiment of the present disclosure may effectively improve performance of semantic segmentation.

Embodiment 8

The embodiment of the present disclosure further provides an electronic device, comprising: a processor and a memory, where the memory stores at least one instruction, at least one program, a code set, or a set of instructions, the at least one instruction, at least one program, a code set, or a set of instructions loaded by the processor and executed to implement the corresponding contents in the foregoing method embodiment. Alternatively, the electronic device may further comprise a transceiver. The processor is connected to the transceiver, such as via a bus. It should be noted that, in practical application, the transceiver is not limited to one, and the structure of the electronic device does not constitute a limitation on the embodiment of the present disclosure.

The processor may be a CPU, a general-purpose processor, a DSP, an ASIC, an FPGA or other programmable logic device, a transistor logic device, a hardware component, or any combination thereof, the various illustrative logical blocks, modules, and circuits described in combination with the examples disclosed herein may be implemented or performed with the processor. The processor may also be implemented as a combination of computing devices, e.g., a combination of one or more microprocessor, a combination of a DSP and a microprocessor, etc.

The bus may comprise a path for transferring information between the components described above. The bus may be a PCI bus or an EISA bus, etc. The bus may include an address bus, a data bus, a control bus, and the like. The memory 802 may be a ROM or another type of static storage device that may store static information and instructions, a RAM or another type of dynamic storage devices that may store information and instructions; and may also be an EEPROM, a CD-ROM, or other compact disc storage, an optical disk (including a compact disc, a laser disc, an optical disc, a digital versatile disc, and a blu-ray disc, or the like) storage, and magnetic disk storage medium or other magnetic storage devices, or any other medium that may be used to carry or store expected program code that has an instruction or digital structure form and that may be accessed by a computer, which, however, is not limited herein.

The embodiment of the present disclosure further provides a computer readable storage medium, for storing computer instructions, which, when executed on a computer, enables the computer to execute the corresponding content in the foregoing method embodiments.

It should be understood that although the steps in the flowcharts of drawings are presented successively according to the arrows, these steps will not be successively performed necessarily in the order indicated by the arrows. Unless expressly stated by the present disclosure, these steps will not be limited to a strict order, but may be performed in any order. Furthermore, at least a part of the steps in the flowcharts of drawings may include multiple sub-steps or multiple stages. These sub-steps or stages will not necessarily be performed at the same time, but may be performed in different time. These sub-steps or stages will not necessarily be performed successively, but may be performed alternatively with other steps or at least a part of the sub-steps or stages of other steps.

The preceding examples of are preferable examples of the invention. Ordinary technical personnel in the field may make some improvements and modifications without departing from principles of the invention, and these improvements and modifications also belong to the protection scope of the invention.

The invention claimed is:

1. A method for operating an electronic device for image segmentation, the method comprising:
   performing feature extraction on an image through a feature extraction network to obtain a feature map as a three-dimensional matrix, wherein directions of the feature map include a first direction, a second direction, and a third direction; and
   performing feature map processing on the feature map using a convolution operation or a pooling operation for at least two of the directions of the feature map to complete semantic segmentation of the image,
   wherein the first direction, the second direction, and the third direction are orthogonal to each other.

2. The method of claim 1, wherein the first direction is a front-rear direction, the second direction is an up-down direction, and the third direction is a left-right direction.

3. The method of claim 1, wherein performing the feature map processing comprises
   performing fusion processing on operation results of the at least two directions of the feature map.

4. The method of claim 3, wherein performing the convolution operation is based on
   a convolution mode or a convolution parameter corresponding to each direction; and
   wherein performing the pooling operation is based on
   a pooling mode or a pooling parameter corresponding to each direction.

5. The method of claim 4, before performing the convolution operation, further comprising:
   determining the convolution mode or the convolution parameter corresponding to each direction, according to a device status or a task requirement.

6. The method of claim 4, wherein the at least two directions comprise a set main direction of the feature map; and
   before performing the convolution operation, the method further comprises:
   determining convolution modes or convolution parameters corresponding to other directions, according to a convolution mode or a convolution parameter corresponding to the main direction of the feature map; and
   before performing the pooling operation for the at least two directions of the feature map, according to the pooling mode or the pooling parameter corresponding to each direction, determining pooling modes or pooling parameters corresponding to other directions, according to a pooling mode or a pooling parameter corresponding to the main direction of the feature map.

7. The method of claim 4, wherein the convolution parameter comprises at least one of a convolution kernel size, a dilation rate, a convolution step size, and a parameter amount; and
the pooling parameter comprises at least one of a pooling kernel size and a pooling step size.

8. The method of claim 3, wherein performing the fusion processing comprises any one of the following cases:
performing fusion processing on a convolution operation result of each direction, if performing convolution operation for the at least two directions of the feature map, respectively,
performing fusion processing on a pooling operation result of each direction, if performing pooling operation for the at least two directions of the feature map, respectively;
performing fusion processing on a convolution operation result and a pooling operation result of each direction, if performing convolution operation and pooling operation for the at least two directions of the feature map simultaneously and respectively; and
performing fusion processing on a pooling operation result of each direction, if performing convolution operation and pooling operation for the at least two directions of the feature map successively and respectively.

9. The method of claim 3, wherein performing the fusion processing on operation results of the at least two directions comprises:
determining a fusion weight or feature offset information corresponding to each operation result, for each of operation results of the at least two directions, respectively;
performing predetermined processing on each operation result according to the fusion weight or the feature offset information, respectively; and
performing fusion processing on each operation result passing through a predetermined processing.

10. The method of claim 9, before performing the fusion processing on each operation result passing through a predetermined processing, the method further comprises:
performing a skip connection processing on the operation result and an output result of the operation result in which passing through a predetermined processing, respectively, for each of operation results of the at least two directions,
wherein performing the fusion processing on each operation result passing through the predetermined processing comprises:
performing fusion processing on each skip-connection processed operation result.

11. The method of claim 10, wherein performing the predetermined processing on the each operation result according to the fusion weight or the feature offset information, respectively, comprises at least one of the following items:
performing weighting processing on each operation result, respectively, according to the fusion weight;
performing weighting processing on each weighting-processed output result, respectively, according to the fusion weight;
performing weighting processing on each offset-processed output result, respectively, according to the fusion weight;
performing weighting processing on each skip-connection-processed output result, respectively, according to the fusion weight;
performing offset processing on each operation result, respectively, according to the feature offset information;
performing offset processing on each weighting-processed output result, respectively, according to the feature offset information;
performing offset processing on each offset-processed output result, respectively, according to the feature offset information; and
performing offset processing on each skip-connection-processed output result respectively, according to the feature offset information.

12. The method of claim 9, further comprising:
determining corresponding channel correlation features according to a feature map obtained by combining operation results of the at least two directions; and
determining a fusion weight corresponding to each operation result, which comprises:
determining a fusion weight corresponding to each of the operation results of the at least two directions, respectively, according to the channel correlation features; and
determining feature offset information corresponding to each operation result, which comprises:
determining feature offset information corresponding to each of the operation results of the at least two directions, respectively, according to the channel correlation features.

13. An apparatus of an electronic device, comprising:
a processor and a memory, the memory storing at least one instruction, at least one program, a code set, or a set of instructions, and the at least one instruction, the at least one program, the code set, or the set of instructions being loaded by the processor and executed to implement the method for image segmentation according to claim 1.

14. An apparatus of an electronic device, comprising:
a feature extraction module; and
a feature map processing module,
the feature extraction module being configured to:
perform feature extraction on an image through a feature extraction network to obtain a feature map as a three-dimensional matrix, wherein directions of the feature map include a first direction, a second direction, and a third direction, and
the feature map processing module being configured to:
perform feature map processing on the feature map using a convolution operation or a pooling operation for at least two of the directions of the feature map to complete semantic segmentation of the image,
wherein the first direction, the second direction, and the third direction are orthogonal to each other.

15. The apparatus of claim 14, wherein the first direction is a front-rear direction, the second direction is an up-down direction, and the third direction is a left-right direction.

16. The apparatus of claim 14, wherein the feature map processing module is further configured to:
perform fusion processing on the operation results of the at least two directions.

17. The apparatus of claim 16, wherein
performing the convolution operation is based on a convolution mode or a convolution parameter corresponding to each directional, and
wherein performing the pooling operation is based on a pooling mode or a pooling parameter corresponding to each direction.

18. The apparatus of claim 17, wherein the convolution parameter comprises at least one of a convolution kernel size, a dilation rate, a convolution step size, and a parameter amount; and wherein the pooling parameter comprises at least one of a pooling kernel size and a pooling step size.

19. The apparatus of claim 16, wherein the feature map processing module, in order to perform the fusion processing on the operation results of the at least two directions, is further configured to:

perform fusion processing on a convolution operation result of each direction, if performing convolution operation for the at least two directions of the feature map, respectively, perform fusion processing on a pooling operation result of each direction, if performing pooling operation for the at least two directions of the feature map, respectively;

perform fusion processing on a convolution operation result and a pooling operation result of each direction, if performing convolution operation and pooling operation for the at least two directions of the feature map simultaneously and respectively;

perform fusion processing on a pooling operation result of each direction, if performing convolution operation and pooling operation for the at least two directions of the feature map successively and respectively.

* * * * *

UNITED STATES PATENT AND TRADEMARK OFFICE
CERTIFICATE OF CORRECTION

PATENT NO. : 11,893,780 B2  
APPLICATION NO. : 17/294020  
DATED : February 6, 2024  
INVENTOR(S) : Jianlong Yuan et al.

Page 1 of 1

It is certified that error appears in the above-identified patent and that said Letters Patent is hereby corrected as shown below:

In the Claims

In Column 52, Line 64, in Claim 17:
"ing to each directional, and"
Should be:
-- ing to each direction, and --

Signed and Sealed this
Fourth Day of February, 2025

Coke Morgan Stewart
*Acting Director of the United States Patent and Trademark Office*